US012687836B2

(12) United States Patent
Huang et al.

(10) Patent No.: US 12,687,836 B2
(45) Date of Patent: Jul. 21, 2026

(54) EXTENDED FABRICATION-AWARE CONVOLUTION LEARNING FRAMEWORK FOR PREDICTING 3D SHAPE DEFORMATION IN ADDITIVE MANUFACTURING

(71) Applicant: UNIVERSITY OF SOUTHERN CALIFORNIA, Los Angeles, CA (US)

(72) Inventors: Qiang Huang, Los Angeles, CA (US); Yuanxiang Wang, Los Angeles, CA (US); Cesar Ruiz Torres, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 433 days.

(21) Appl. No.: 18/567,311

(22) PCT Filed: Jul. 7, 2022

(86) PCT No.: PCT/US2022/036317
§ 371 (c)(1),
(2) Date: Dec. 5, 2023

(87) PCT Pub. No.: WO2023/283308
PCT Pub. Date: Jan. 12, 2023

(65) Prior Publication Data
US 2024/0272614 A1 Aug. 15, 2024

Related U.S. Application Data

(60) Provisional application No. 63/219,077, filed on Jul. 7, 2021.

(51) Int. Cl.
G05B 19/4099 (2006.01)
B33Y 50/02 (2015.01)
G06T 17/10 (2006.01)

(52) U.S. Cl.
CPC .......... *G05B 19/4099* (2013.01); *B33Y 50/02* (2014.12); *G06T 17/10* (2013.01); *G05B 2219/49023* (2013.01)

(58) Field of Classification Search
CPC ........................... G05B 19/4099; G06F 30/27
See application file for complete search history.

(56) References Cited

U.S. PATENT DOCUMENTS 10,996,652 B2 * 5/2021 Chin ........................ B22F 10/00
11,150,633 B2 * 10/2021 de Souza Borges Ferreira ...........
G05B 19/4099
(Continued)

OTHER PUBLICATIONS

International Search Report and Written Opinion for International PCT Patent Application No. PCT/US2022/036317, date of search Oct. 21, 2022, 9 pages.
(Continued)

*Primary Examiner* — Mohammad Ali
*Assistant Examiner* — Vincent W Chang
(74) *Attorney, Agent, or Firm* — Snell & Wilmer LLP

(57) ABSTRACT

An apparatus, system, and method is provided for predicting 3D shape deformation in additive manufacturing. A convolution learning framework for shape deviation modeling provides joint learning for a wide class of 3D shapes including both spherical and polyhedral shapes. A 3D cookie-cutter function can effectively capture the unique pattern of the shape deformation for polyhedral shapes. Since 3D freeform shapes can be approximated as a combination of spherical and polyhedral patches, the extended convolution learning framework builds a foundation for modeling and predicting the quality of 3D freeform shapes. By changing the kernel function and considering new distance measures for points from different shapes, the spatial correlations among different shapes can be correctly incor-
(Continued)

porated. The predicted deformation may be used to offset the machine instructions to an additive manufacturing machine to ameliorate deformation.

20 Claims, 23 Drawing Sheets

(56) References Cited

U.S. PATENT DOCUMENTS

| | | | |
|---|---|---|---|
| 12,570,051 B2 * | 3/2026 | Huang | ................. B29C 64/386 |
| 2016/0046076 A1 | 2/2016 | Huang et al. | |
| 2016/0320771 A1 * | 11/2016 | Huang | .................. B33Y 50/00 |
| 2018/0095450 A1 | 4/2018 | Lappas et al. | |
| 2020/0361155 A1 | 11/2020 | Jones et al. | |
| 2021/0191363 A1 | 6/2021 | Mehr et al. | |
| 2021/0295594 A1 * | 9/2021 | Sinha | ................... G06V 10/764 |
| 2023/0051704 A1 * | 2/2023 | Luan | ......................... G06N 3/09 |
| 2024/0395016 A1 * | 11/2024 | Singh | ................... G06V 10/764 |

OTHER PUBLICATIONS

Qiang Huang et al. "Shape deviation generator (SDG)—A convolution framework for learning and predicting 3D printing shape accuracy", IEEE Transactions on Automation Science and Engineering, vol. 17, No. 3, 15 pages, Jul. 2020.

* cited by examiner

201

203

501

505

507

900

1300

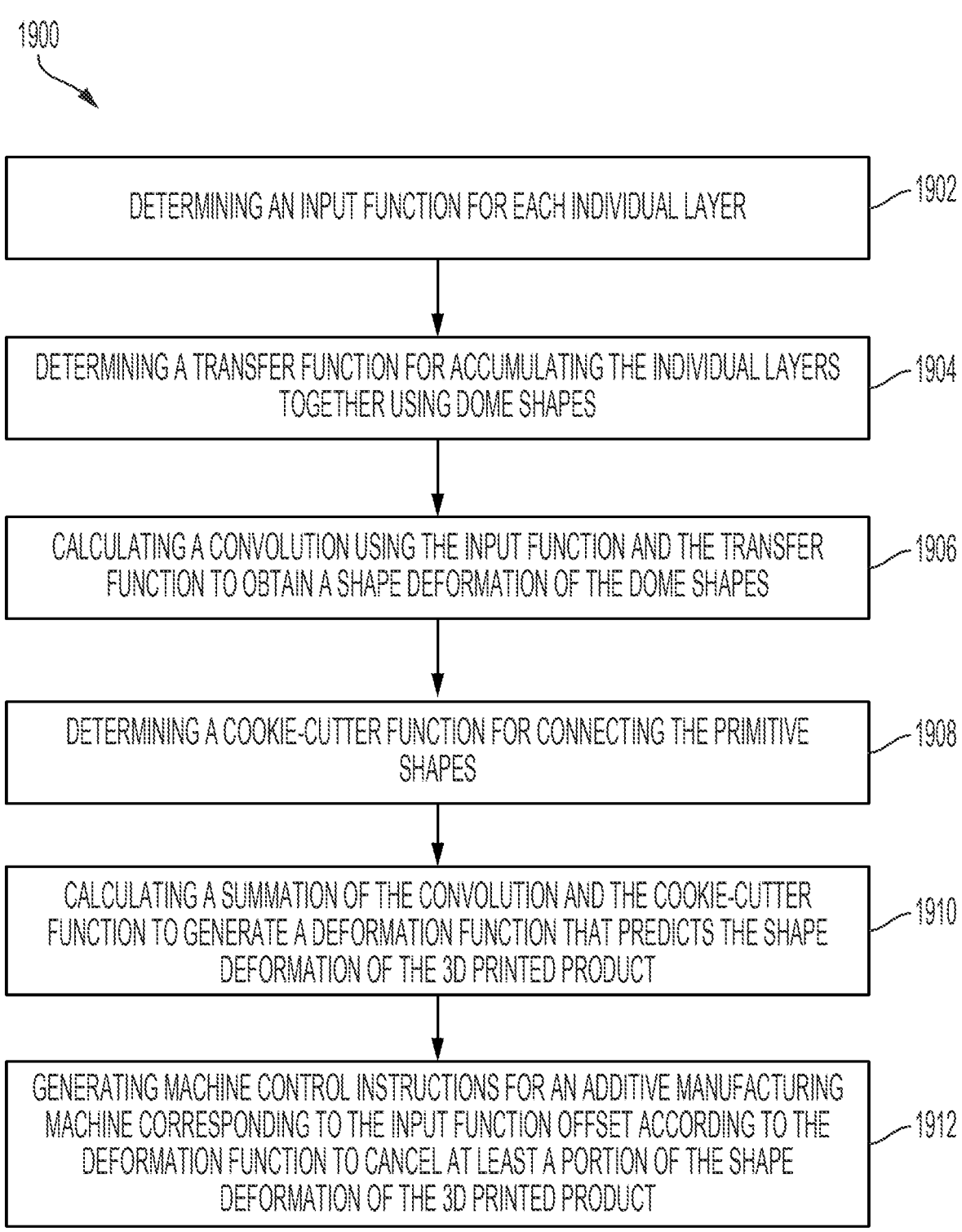

1900

DETERMINING AN INPUT FUNCTION FOR EACH INDIVIDUAL LAYER — 1902

DETERMINING A TRANSFER FUNCTION FOR ACCUMULATING THE INDIVIDUAL LAYERS TOGETHER USING DOME SHAPES — 1904

CALCULATING A CONVOLUTION USING THE INPUT FUNCTION AND THE TRANSFER FUNCTION TO OBTAIN A SHAPE DEFORMATION OF THE DOME SHAPES — 1906

DETERMINING A COOKIE-CUTTER FUNCTION FOR CONNECTING THE PRIMITIVE SHAPES — 1908

CALCULATING A SUMMATION OF THE CONVOLUTION AND THE COOKIE-CUTTER FUNCTION TO GENERATE A DEFORMATION FUNCTION THAT PREDICTS THE SHAPE DEFORMATION OF THE 3D PRINTED PRODUCT — 1910

GENERATING MACHINE CONTROL INSTRUCTIONS FOR AN ADDITIVE MANUFACTURING MACHINE CORRESPONDING TO THE INPUT FUNCTION OFFSET ACCORDING TO THE DEFORMATION FUNCTION TO CANCEL AT LEAST A PORTION OF THE SHAPE DEFORMATION OF THE 3D PRINTED PRODUCT — 1912

FIG. 19

EXTENDED FABRICATION-AWARE CONVOLUTION LEARNING FRAMEWORK FOR PREDICTING 3D SHAPE DEFORMATION IN ADDITIVE MANUFACTURING

CROSS-REFERENCE TO RELATED APPLICATIONS

This application is based upon and claims priority to U.S. provisional patent application No. 63/219,077 entitled "EXTENDED FABRICATION-AWARE CONVOLUTION LEARNING FRAMEWORK FOR PREDICTING 3D SHAPE DEFORMATION IN ADDITIVE MANUFAC-TURING" and filed on Jul. 7, 2021, the entire content of which is incorporated herein by reference.

STATEMENT AS TO FEDERALLY SPONSORED RESEARCH

This invention was made with United States government support under Contract No. NSF CMMI-1901514 by the National Science Foundation. The United States government has certain rights in this invention.

BACKGROUND

1. Field

This disclosure relates generally to additive manufacturing, and more specifically, to a fabrication-aware convolution learning framework for predicting 3D shape deformation in additive manufacturing.

2. Description of the Related Art

As a revolutionary technology, additive manufacturing (AM) or three-dimensional (3D) printing enables the mass customization of parts with highly complex geometries through layer-by-layer fabrication using various materials including metals, ceramics, polymers, and their composites, hybrid, or functionally graded materials. However, AM introduces process and path dependencies, particularly in connection with 3D shape deformation of additively manu-factured parts. For instance, as material is additively con-tributed to the part being constructed, later-added material and earlier-added material interacts, causing the 3D shape to deform. Thus, there remains a need for a learning framework to predict 3D shape deformation for complex three-dimen-sional structures.

SUMMARY

A method for predicting a shape deformation of a 3D printed product is provided. The 3D printed product may have a 3D model made up from primitive shapes and having a plurality of individual layers. The method may include determining, using a processor, an input function for each individual layer, the input function describing a layer-wise shape deformation of the each individual layer with 2D freeform shapes. The method may include determining, using the processor, a transfer function for accumulating the individual layers together using dome shapes. The method may include calculating, using the processor, a convolution using the input function and the transfer function to obtain a shape deformation of the dome shapes. The method may include determining, using the processor, a cookie-cutter function for connecting the primitive shapes comprising the 3D model. The method may include calculating, using the processor, a summation of the convolution and the cookie-cutter function to generate a deformation function that predicts the shape deformation of the 3D printed product.

In various embodiments, the method also includes gen-erating machine control instructions for an additive manu-facturing machine corresponding to the input function offset according to the deformation function to cancel at least a portion of the shape deformation of the 3D printed product.

In various embodiments, the primitive shapes are sphere shapes and polyhedron shapes. Moreover, machine learning techniques may be used to determine the transfer function. Machine learning techniques may be used to determine the cookie-cutter function. The transfer function may include a plurality of functional bases including Fourier bases. Deter-mining the deformation function may include executing a gaussian process regression (GPR).

A system is provided. The system may be for predicting a shape deformation of a 3D printed product including a 3D model made up from primitive shapes and having a plurality of individual layers. The system may include a non-transi-tory computer-readable memory configured to store instruc-tions. The system may include one or more processor. The one or more processors may be configured to determine an input function for each individual layer, the input function describing a layer-wise shape deformation of each indi-vidual layer with 2D freeform shapes. The one or more processors may be configured to determine a transfer func-tion for accumulating the individual layers together using dome shapes. The one or more processors may be configured to calculate a convolution using the input function and the transfer function to obtain a shape deformation of the dome shapes. The one or more processors may be configured to determine a cookie-cutter function for connecting the primi-tive shapes comprising the 3D model. The one or more processors may be configured to calculate a summation of the convolution and the cookie-cutter function to generate a deformation function that predicts the shape deformation of the 3D printed product.

The one or more processor (the processor) may be con-figured to generate machine control instructions for an additive manufacturing machine corresponding to the input function offset according to the deformation function to cancel at least a portion of the shape deformation of the 3D printed product.

In various embodiments, the primitive shapes include sphere shapes and polyhedron shapes. The processor may determine the transfer function using machine learning techniques. The processor may determine the cookie-cutter function using machine learning techniques. The transfer function may include a plurality of functional bases includ-ing Fourier bases. The processor may also execute a gauss-ian process regression (GPR) when determining the defor-mation function.

A non-transitory computer-readable medium is provided. The medium may include computer readable instructions, which when executed by a processor, cause the processor to perform operations for predicting a shape deformation of a 3D printed product including a 3D model made up from primitive shapes and having a plurality of individual layers. The operations may include determining, using the proces-sor, an input function for each individual layer, the input function describing a layer-wise shape deformation of each individual layer with 2D freeform shapes. The operations may include determining, using the processor, a transfer function for accumulating the individual layers together using dome shapes. The operations may include calculating, using the processor, a convolution using the input function and the transfer function to obtain a shape deformation of the dome shapes. The operations may include determining, using the processor, a cookie-cutter function for connecting the primitive shapes comprising the 3D model. The operations may include calculating, using the processor, a summation of the convolution and the cookie-cutter function to generate a deformation function that predicts the shape deformation of the 3D printed product.

In various embodiments, the operations further include generating machine control instructions for an additive manufacturing machine corresponding to the input function offset according to the deformation function to cancel at least a portion of the shape deformation of the 3D printed product.

The primitive shapes may be sphere shapes and polyhedron shapes. The operations may further include determining the transfer function using machine learning techniques. The operations may further include determining the cookie-cutter function using machine learning techniques. The transfer function may include a plurality of functional bases including Fourier bases.

BRIEF DESCRIPTION OF THE DRAWINGS

Other systems, methods, features, and advantages of the present invention will be or will become apparent to one of ordinary skill in the art upon examination of the following figures and detailed description.

FIG. 19 illustrates a method for predicting a shape deformation of a 3D printed product comprising a 3D model made up from primitive shapes and having a plurality of individual layers, in accordance with various embodiments.

DETAILED DESCRIPTION

As a revolutionary technology, additive manufacturing (AM) or three-dimensional (3D) printing enables the mass customization of parts with highly complex geometries through layer-by-layer fabrication using various materials including metals, ceramics, polymers, and their composites, hybrid, or functionally graded materials.

Figure 1A:
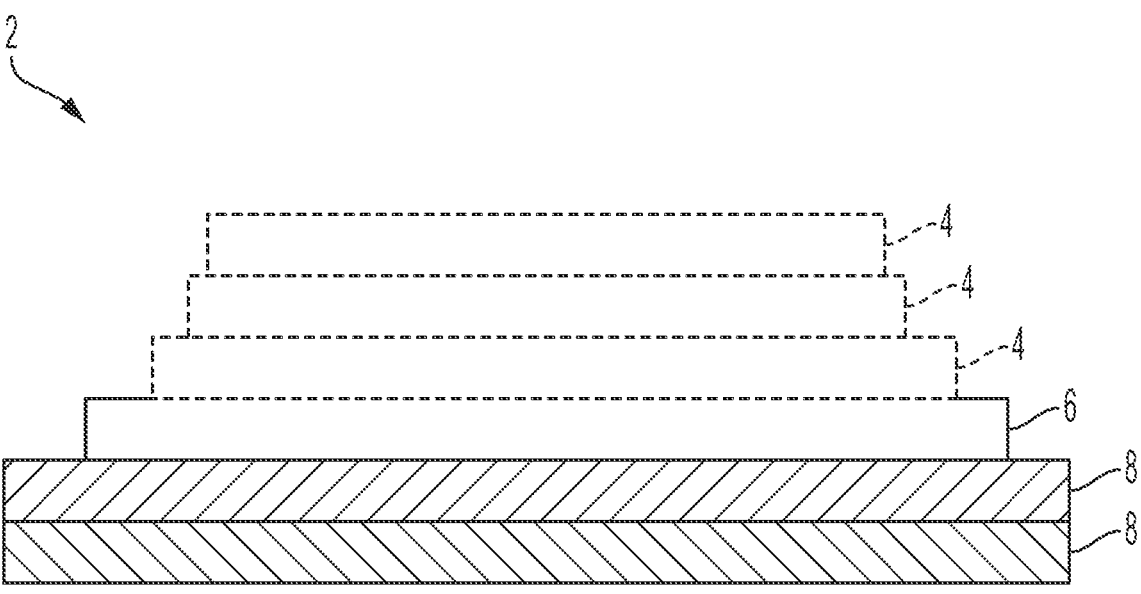
FIG. 1A shows a 3D object being manufactured by additive manufacturing, in accordance with various embodiments.

With reference to FIG. 1A, an additive manufacturing (AM) process frequently builds 3D objects 2 layer-by-layer. While the shape of a 3D object can be highly complex and arbitrary, a 3D object can be represented as a set of stacked layers in 2D shapes. The 2D shapes may be termed primitives or primitive shapes. Primitive shapes may include curves. Primitive shapes may include spherical shapes.

Primitive shapes may include polyhedrons. Other primitive shapes may be contemplated. In one example, a dome could be represented as a set of stacked circles of decreasing radius. FIG. 1A shows a 3D object 2 made of a stack of already manufactured layers 8, a layer under current manufacturing 6, and yet-to-be manufactured layers 4.

The systems and methods described herein use a novel 3D shape deviation model with a convolution formulation to model and learn the 3D shape generation process and its deviations. A data-analytical framework enables machine learning of measurement data of 3D printed products. The systems and methods for predicting the shape deformation of domes and thin walls of 3D printed products are also disclosed.

Figure 1B:
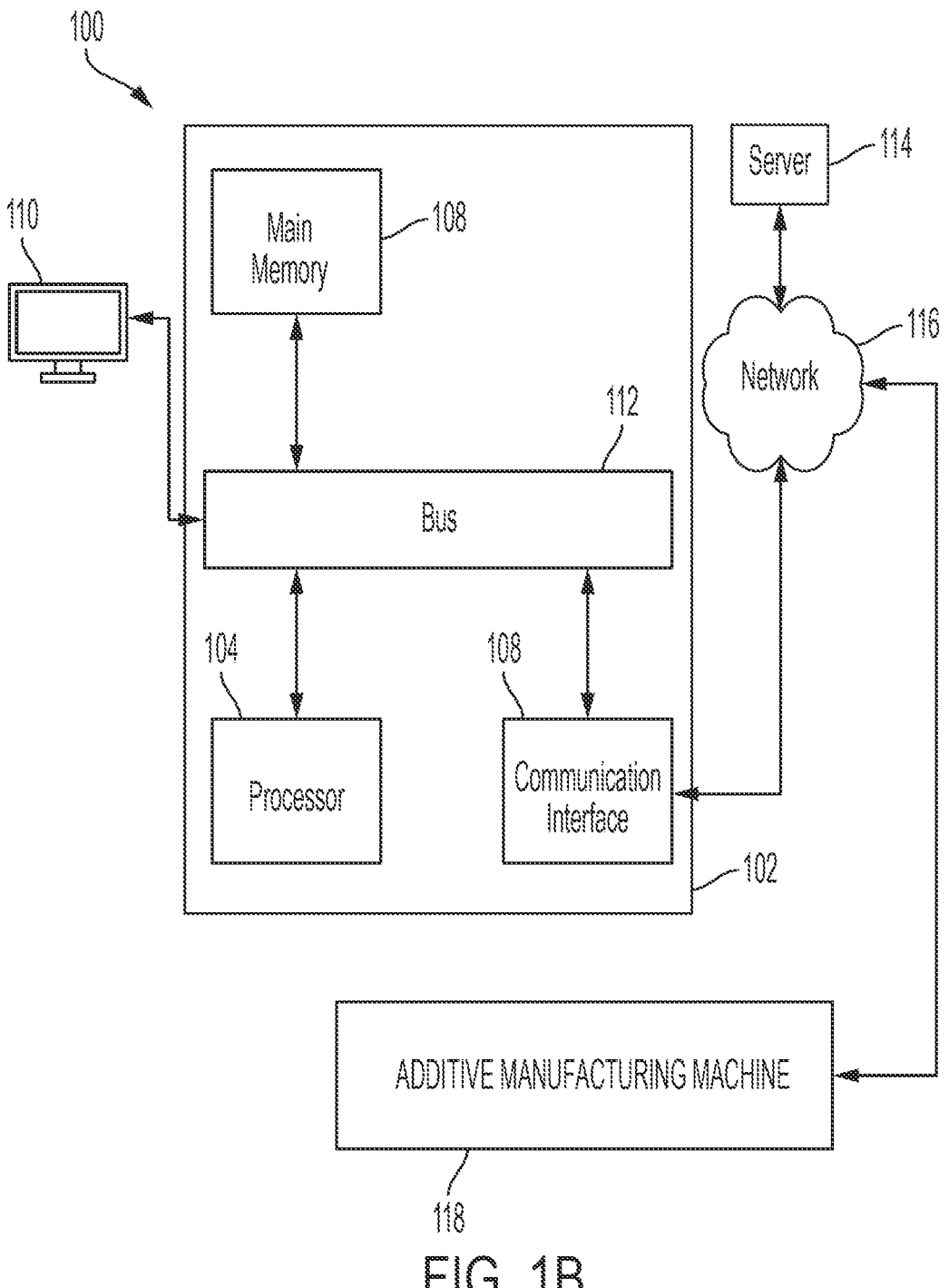
FIG. 1B shows aspects of a 3D shape deviation system for additive manufacturing, in accordance with various embodiments.

With reference to FIG. 1B, the 3D shape deviation system may include a computing system 100. The computing system 100 may include a computing apparatus 102. The computing apparatus 102 may include one or more processors 104, a memory 106 and/or a bus 112 and/or other mechanisms for communicating between the one or more processors 104. The computing system 100 may be a cloud computing system including processors, servers, storage, databases, networking, software, analytics, and/or intelligence accessed or performed over or using the Internet ("the cloud"). The one or more processors 104 may be implemented as a single processor or as multiple processors. The one or more processors 104 may execute instructions stored in the memory 106 to implement the applications and/or detection of the computing system 100.

The one or more processors 104 may be coupled to the memory 106. The memory 106 may include one or more of a Random Access Memory (RAM) or other volatile or non-volatile memory. The memory 106 may be a non-transitory memory or a data storage device, such as a hard disk drive, a solid-state disk drive, a hybrid disk drive, or other appropriate data storage, and may further store machine-readable instructions, which may be loaded and executed by the one or more processors 104.

The memory 106 may include one or more of random access memory ("RAM"), static memory, cache, flash memory and any other suitable type of storage device or computer readable storage medium, which is used for storing instructions to be executed by the one or more processors 104. The storage device or the computer readable storage medium may be a read only memory ("ROM"), flash memory, and/or memory card, that may be coupled to a bus 112 or other communication mechanism. The storage device may be a mass storage device, such as a magnetic disk, optical disk, and/or flash disk that may be directly or indirectly, temporarily or semi-permanently coupled to the bus 112 or other communication mechanism and be electrically coupled to some or all of the other components within the computing system 100 including the memory 106, the user interface 110 and/or the communication interface 108 via the bus 112.

The term "computer-readable medium" is used to define any medium that can store and provide instructions and other data to a processor, particularly where the instructions are to be executed by a processor and/or other peripheral of the processing system. Such medium can include non-volatile storage, volatile storage and transmission media. Non-volatile storage may be embodied on media such as optical or magnetic disks. Storage may be provided locally and in physical proximity to a processor or remotely, typically by use of network connection. Non-volatile storage may be removable from computing system, as in storage or memory cards or sticks that can be easily connected or disconnected from a computer using a standard interface.

The system 100 may include a user interface 110. The user interface 110 may include an input/output device. The input/output device may receive user input, such as a user interface element, hand-held controller that provides tactile/proprioceptive feedback, a button, a dial, a microphone, a keyboard, or a touch screen, and/or provides output, such as a display, a speaker, an audio and/or visual indicator, or a refreshable braille display. The display may be a computer display, a tablet display, a mobile phone display, an augmented reality display or a virtual reality headset. The display may output or provide a data-analytical framework that enables machine learning of measurement data of 3D printed products.

The user interface 110 may include an input/output device that receives user input, such as a user interface element, a button, a dial, a microphone, a keyboard, or a touch screen, and/or provides output, such as a display, a speaker, headphones, an audio and/or visual indicator, a device that provides tactile/proprioceptive feedback or a refreshable braille display. The speaker may be used to output audio associated with the audio conference and/or the video conference. The user interface 110 may receive user input that may include configuration settings for one or more user preferences, such as a selection of joining an audio conference or a video conference when both options are available, for example.

The system 100 may have a network 116 connected to a server 114. The network 116 may be a local area network (LAN), a wide area network (WAN), a cellular network, the Internet, or combination thereof, that connects, couples and/or otherwise communicates between the various components of the system 100 with the server 114. The server 114 may be a remote computing device or system that includes a memory, a processor and/or a network access device coupled together via a bus. The server 114 may be a computer in a network that is used to provide services, such as accessing files or sharing peripherals, to other computers in the network.

The system 100 may include a communication interface 108, such as a network access device. The communication interface 108 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The communication interface may transmit data to and receive data from the different components.

The server 114 may include a database. A database is any collection of pieces of information that is organized for search and retrieval, such as by a computer, and the database may be organized in tables, schemas, queries, reports, or any other data structures. A database may use any number of database management systems. The information may include real-time information, periodically updated information, or user-inputted information.

The system 100 may include an additive manufacturing machine 118. The additive manufacturing machine 118 may implement mask image projection stereolithography (MIP-SLA) technology. The additive manufacturing machine 118 may implement other technologies. The additive manufacturing machine 118 may be connected to the computing apparatus 102 via the network 116. The computing apparatus 102 may, in cooperation with other aspects of the system 100, provide instructions to the additive manufacturing machine 118 for the manufacturing of a 3D printed product.

These instructions may include data corresponding to 3D shape deformation to ameliorate the effects of 3D shape deformation on the shape of a 3D printed product. In further instances, the computing apparatus 102 is connected directly to the additive manufacturing machine 118 via a direct wired or wireless connection.

The system 100 implements various methods as discussed further herein. In general, geometric accuracy control is critical for precision additive manufacturing (AM). To learn and predict the shape deformation from a limited number of training products, a fabrication-aware convolution learning framework has been developed to describe the layer-by-layer fabrication process. The convolution learning framework is extended to include broad categories of 3D geometries by constructively incorporating spherical and polyhedral shapes into a unified model. This is achieved by extending a 2D cookie-cutter modeling approach to a 3D case and by modeling spatial correlation among neighboring regions. Methodologies demonstrated with real case studies show the capabilities of prescriptive modeling and control of complicated shape quality in AM.

With advances in computing and increased availability of product data, Machine Learning for Additive Manufacturing (ML4AM) has become a viable strategy for enhancing 3D printing accuracy. This work establishes a learning framework as a novel data analytical tool through the combination of convolution formulation and cookie-cutter functions to model the 3D shape formation in AM process. This new engineering-informed machine learning framework facilitates the learning of AM data to establish models for geometric shape accuracy prediction and control.

I. Introduction to an Example Implementation

In one example implementation, as a revolutionary technology, additive manufacturing (AM) or three-dimensional (3D) printing enables the mass customization of parts with highly complex geometries through layer-by-layer fabrication using various materials including metals, ceramics, polymers, and their composites, hybrid, or functionally-graded materials. Unlike traditional subtracting manufacturing methods, such as milling, machining, carving, and shaping, AM has the potential of building extremely complex geometries with high efficiency and low material waste. However, one major barrier for broader adoption of AM techniques is the geometric shape inaccuracy. Due to a wide spectrum of AM processes, low sample size caused by one-of-a-kind manufacturing, and complicated geometries, accuracy control has been a daunting task for researchers and practitioners.

Three example types of methodologies have been developed to improve the shape accuracy: (1) physics-based modeling and simulation based on first principles; (2) data-driven modeling using statistical and machine learning (ML) techniques; and (3) physics-informed ML modeling by incorporating process knowledge into modeling and learning. One major part of physics-based modeling strategies applies finite element methods (FEM) to predict the final product quality. For example, one strategy includes a multi-scale modeling approach based on the comprehensive physical understanding of both the powder scale and the part scale to predict shape accuracy, residual stress, and material properties of the laser powder bed fusion process. Another strategy includes a micro-scale model for electron-material interaction, a mesoscale model for powder particle evolution, and a macro-scale model using FEM. These models can achieve voxel-level accuracy for describing 3D products during the printing process, but at a high computational cost. Moreover, the development of such models requires extensive expert knowledge and the models are restricted to a specific type of AM processes and/or materials.

To improve printing accuracy, process optimization may be employed with both online and offline observations. For instance, one may monitor in situ temperature and pressure inside a nozzle of a fused filament fabrication printer to minimize their fluctuation during a fabrication process. To reduce the slicing error incurred when transforming the computer-aided design (CAD) to the building file, one may optimize the slicing plan and building orientation by considering multiple metric profiles including cusp height, surface roughness, area deviation, and volume deviation.

For building data-driven models, machine learning strategies may be explored by using in situ monitoring data such as thermal history and optical sensing data. One may apply deep learning to predict top surface distortion of disks through a combination of convolution neural network (CNN) and artificial neural network (ANN) techniques using thermal history data collected during the printing process. To enable learning from different shapes, one may employ a random forest method to predict the shape deformation of an untried shape by extracting position, geometry and material expansion features from the triangular meshes of other shapes in the FDM process.

Many efforts have been taken to enable model transfer across materials, fabrication processes, and shapes to improve prediction accuracy with a limited number of printed parts. One may accomplish the model transfer from Ti-6Al-4V to 316 L stainless steel through an effect equivalence framework. One may achieve knowledge transfer across different shapes by decomposing the geometric error into shape-independent and shape-specific components, and then fixing the global shape-independent parameters and shape features, respectively. One may propose a Bayesian extreme learning machine methodology to automatically predict the shape deformation pattern of freeform shapes under different printing processes by using knowledge of the shape deformation patterns of simpler shapes printed under the same and different processes. These transfer learning methods may be limited to 2D shapes.

Physics-informed ML aims to predict the shape deformation of arbitrary shapes using a limited number of training products and construct compensation plans to improve the quality of new part. This strategy may be implemented successfully for thin (in height) shapes that can be approximated as 2D shapes for purposes of shape deviation modeling. One may implement a prescriptive statistical modeling approach to predict and compensate the 2D shape deformation of circular shapes considering the size effect and over-exposure. A key challenge to model polygonal shapes is that the deformation pattern changes dramatically on the sharp corners. To transfer the knowledge from circular shape deformations to that of regular polygons, one may use a cookie-cutter function that is parameterized by the number of sides, which cuts the polygons from their circumcircles. After modeling the shape deformation of circular and polygonal shapes, one may predict the shape deformation of 2D freeform products considering a piecewise approximation with circular or polygonal sections and apply a compensation plan that modifies CAD design to control geometric inaccuracy.

The modeling and control issues faced in printing 2D shapes are exacerbated for 3D cases, since the deformation pattern can change from layer-to-layer due to complex process physics including inter-layer interactions. To incorporate the layer-by-layer fabrication mechanism into modeling and learning, one may implement a convolution learning framework to describe the 3D deformation patterns as the result of the 2D shape deformation of each layer convolved with a transfer function that captures inter-layer interactions. Although this framework is validated with spherical shapes built in a stereolithography (SLA) process, it requires fundamental work to predict the complex deformation patterns of spherical and polyhedral shapes together in one consistent modeling framework. A reason to study these particular shapes is that 3D freeform shapes can be approximated as a combination of spherical and polyhedral patches. Understanding of these two basic categories of 3D shapes makes it possible for 3D freeform shape prediction, just as has been demonstrated for 2D case.

In the following sections, Sec. II briefly reviews the convolution framework and proposes a unified model for a broader category of shapes by extending it for both spherical and polyhedral shapes. In Sec. III, joint modeling of shape deformation for domes and thin walls with half-cylindrical shapes is investigated.

II. A Unified Convolution Learning Framework for Shape Deformation Modeling

This section briefly introduces the convolution learning framework for modeling shape deformation of AM-built products. Two types of 3D cookie-cutter functions are proposed to extend the learning framework in order to capture the complex shape deformation profiles for polyhedral products. Furthermore, a Gaussian process with a novel distance metric is introduced to characterize the spatial correlation among neighboring regions and across different shapes.

A. Deformation Modeling of Spherical Products Through a Convolution Framework

The convolution learning framework may be proposed as $$y(x) = (f * g)(x) + \eta + \epsilon, \qquad [1]$$

where y(x) is the shape deviation, x are the features, $f$ is the input function that models the 2D shape deformation in a horizontal layer, g is the transfer function that models the layer-to-layer interactions, $\eta$ is a mean-zero Gaussian process $\mathcal{GP}$ (0, k(·,·)) with covariance kernel function k that captures the spatial correlation, and $\epsilon$ is the measurement error that follows a normal distribution with mean 0 and variance $\sigma^2$.

The deformation y(x) of a 3D printed product from its designed shape is described using the spherical coordinate system (SCS) with dimensions (r, $\theta$, $\varphi$), where $\theta$ is the polar angle and $\varphi$ is the azimuth angle. The measurement point cloud is represented as r($\theta$, $\varphi$) and the designed shape is denoted as $r_0(\theta, \varphi)$. Thus, shape deformation is defined as y(x)=r($\theta$, $\varphi$)−$r_0(\theta, \varphi)$, where x=($r_0(\theta, \varphi)$, $\theta,\varphi$), $\theta \in [0,2\pi]$, and $\varphi \in [0, \pi/2]$.

Figure 2A:
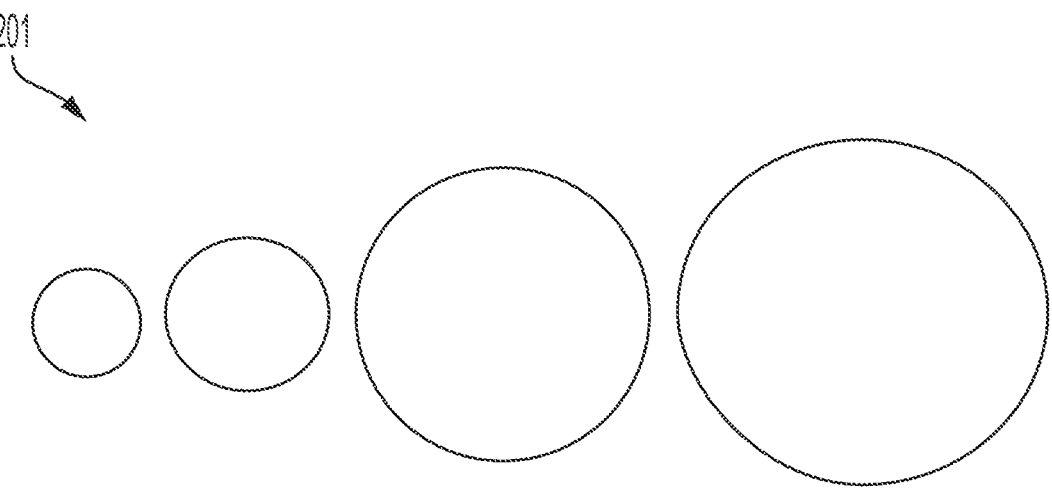
FIG. 2A shows 3D spherical shapes, in accordance with various embodiments.

The first step of the convolution learning framework is to identify the input function $f$, which describes the in-plane shape deformation. For 3D spherical shapes such as domes 201 shown in FIG. 2A, each layer is a circle. Shape deformation for circles of radius $r_0$ can often be modeled with a few Fourier basis functions, for example, $f(r_0, \theta)=c_1(r_0)+c_2(r_0)\cos (2\theta)$. Using this function, one may model the deformation of a dome shape as $$y(r_0, \theta, \varphi) = \beta(r_0) + \alpha(r_0)(f * g)(\theta, \varphi) + \eta + \epsilon. \qquad [2]$$

Then, the size factors $c_1(r_0)$ and $c_2(r_0)$ can be absorbed in $\alpha(r_0)$ and $\beta(r_0)$ in Eq. (2). Since each layer of a dome shape has radius $r_0 \sin \varphi$, the input function for the domes can be normalized, for example, as $$f(\theta, \varphi) = \cos(2\theta) \sin\varphi. \qquad [3]$$

For the transfer function g(x), LASSO model selection is adopted as $$\min_{c} \frac{1}{N} \sum_{i=1}^{N} \left( y_i - \sum_j c_j (f * g_j)(\theta_i, \varphi_i) \right)^2 + \gamma \ \|c\|_1, \qquad [4]$$

where N is the number of sampled points and $g_j(\theta, \varphi)$ is a 2-D Fourier basis function. Significant terms shared among all domes are selected and the final form of the transfer function is $$g(\theta, \varphi) = \cos(n_1\varphi)[1 + \cos(n_2\theta + \psi)]. \qquad [5]$$

Lastly, Gaussian process regression (GPR) over the parametric model residuals $$\bar{y}(r_0, \theta, \varphi) = y(r_0, \theta, \varphi) - \hat{\beta}(r_0) - \hat{\alpha}(r_0)(f * g)(\theta, \varphi)$$

is conducted to take account for the remaining high-order spatial correlation of the deviation profile.

B. Extended Convolution Learning Framework for Shape Deformation Modeling

Figure 5A:
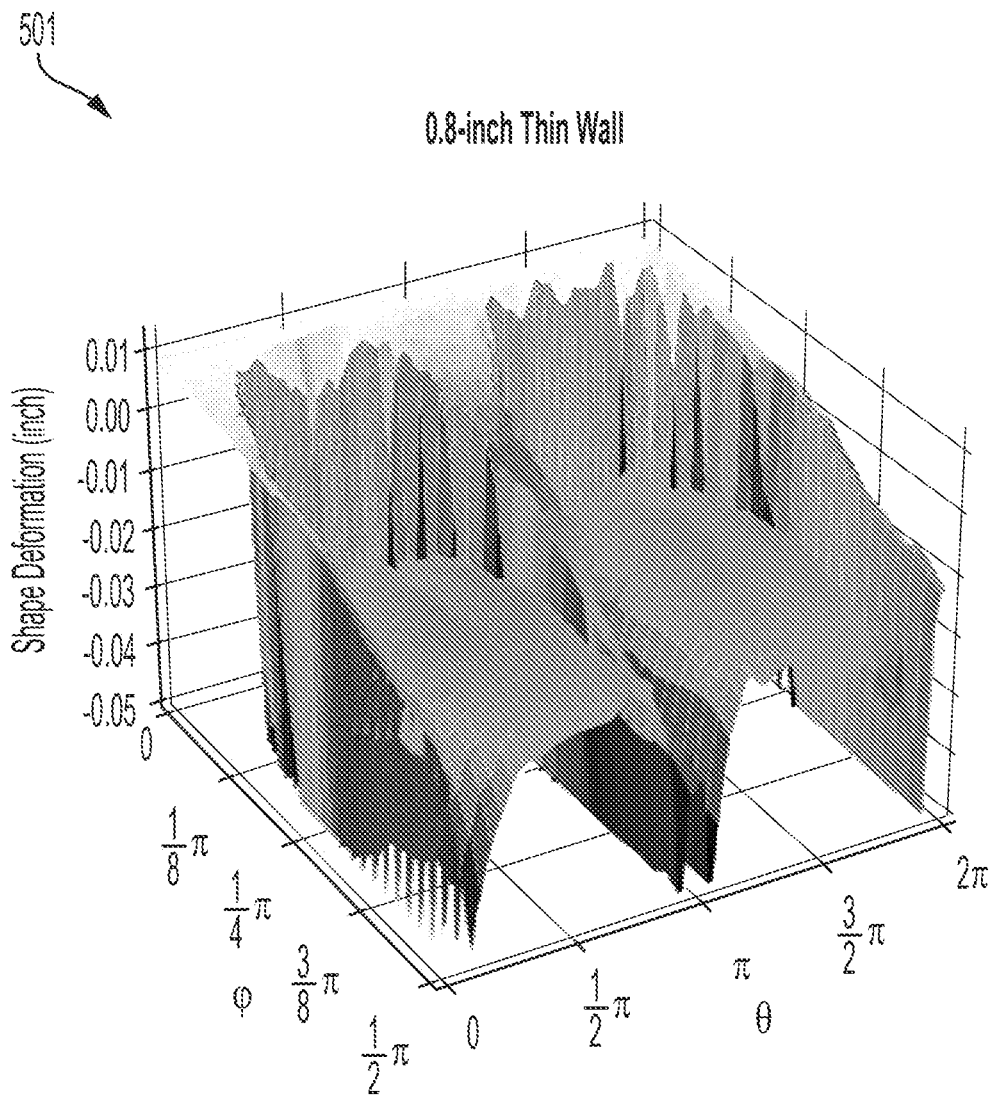
FIG. 5A illustrates shape deformation measurements for an about 0.8-inch (about 2.03 cm) thin wall with half-cylindrical shape, in accordance with various embodiments.
Figure 5B:
FIG. 5B illustrates shape deformation measurements for an about 1.5-inch (about 3.81 cm) thin wall with half-cylindrical shape, in accordance with various embodiments.
Figure 5B:
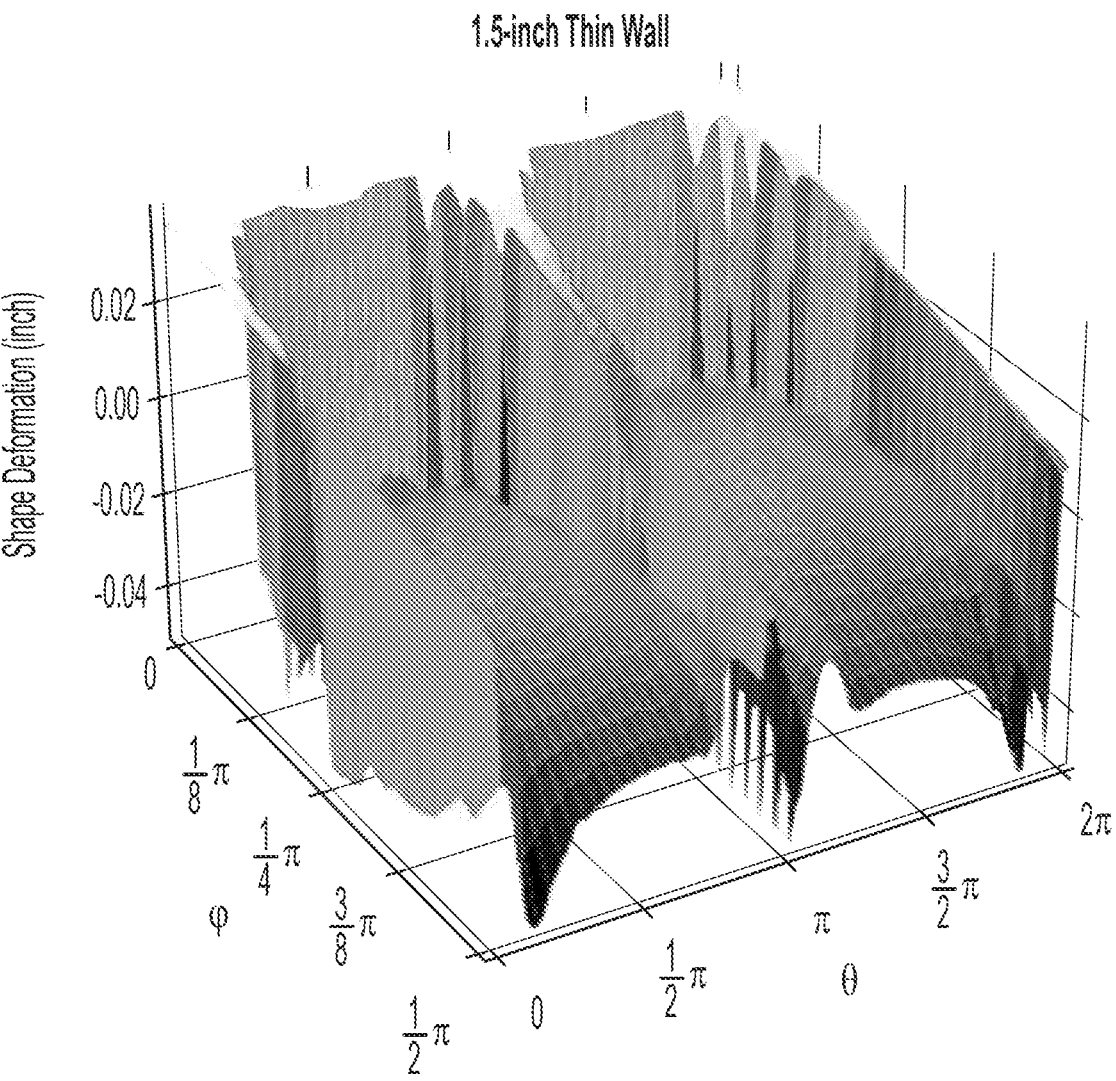
Figure 5C:
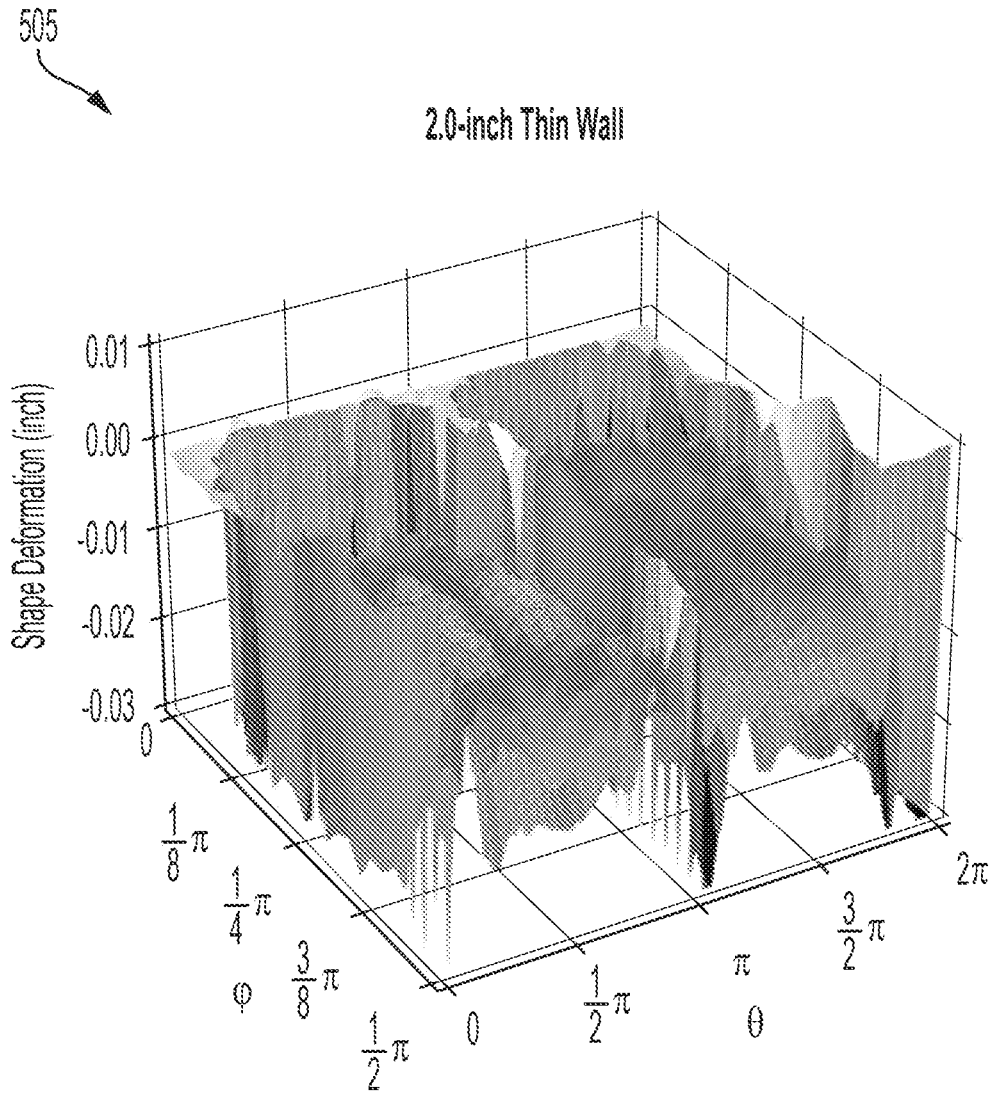
FIG. 5C illustrates shape deformation measurements for an about 2.0-inch (about 5.08 cm) thin wall with half-cylindrical shape, in accordance with various embodiments.
Figure 5D:
FIG. 5D illustrates shape deformation measurements for an about 0.8-inch (about 2.03 cm) dome, in accordance with various embodiments.

Although the convolution framework shown in Eq. (2) is quite general, it struggles to learn the sharp transitions observed in the deformation profiles around the corners of polyhedral shapes (shown in FIGS. 5A-D) because the convolution combines the smoothness of both $f$ and g functions. Moreover, using an excessive number of basis functions would lead to over-fitting. For instance, FIG. 5A-D illustrates shape deformation measurements of three thin walls with half-cylindrical shapes and a 0.8 dome presented in SCS. FIG. 5A illustrates shape deformation measurements 501 for an about 0.8-inch (about 2.03 cm) thin wall with half-cylindrical shape. FIG. 5B illustrates shape deformation measurements 503 for an about 1.5-inch (about 3.81 cm) thin wall with half-cylindrical shape. FIG. 5C illustrates shape deformation measurements 505 for an about 2.0-inch (about 5.08 cm) thin wall with half-cylindrical shape. FIG. 5D illustrates shape deformation measurements 507 for an about 0.8-inch (about 2.03 cm) dome.

In the 2D case, two types of cookie-cutter functions $f_2(\theta, r_0(\theta))$ may be proposed to link the deformation of circular shapes to that of polygons as $$f(\theta, r_0(\theta)) = f_1(\theta, r_0(\theta)) + f_2(\theta, r_0(\theta)) + f_3(\theta, r_0(\theta)) + \epsilon \qquad [6]$$

where $f_1(\theta, r_0(\theta))$ describes circular shape deformation and $f_3(\theta, r_0(\theta))$ is a high-order term.

To generalize this idea to 3D cases, one may model each layer of a polyhedral shape as a polygon being cut from its circumcircle, then the whole product can be carved out from the stack of circular shapes. Thus, one may extend the convolution learning framework to spherical and polyhedral shapes as additive model of the base function for spherical shapes, a 3D cookie-cutter function, and a high-order term for the remaining pattern.

By denoting the convolution term in Eq. (2) as $$h_1(\theta, \varphi) = (f * g)(\theta, \varphi), \qquad [7]$$

the extended convolution learning framework can be written as $$y(r_0(\theta, \varphi), \theta, \varphi) = \qquad [8]$$

$$\alpha_0(r_0) + \alpha_1(r_0)h_1(\theta, \varphi) + \alpha_2(r_0)h_2(\theta, \varphi) + \alpha_3(r_0)h_3(\theta, \varphi) + \eta + \epsilon$$

where the first row corresponds to the model in Eq. (2) describing spherical shape deformation, $h_2$ is the 3D cookie-cutter function, and $h_3$ represents the remaining high-order pattern. Note that $h_1$ can be learned from spherical products, and both $h_2$ and $h_3$ are fully determined by the geometries of AM-fabricated products.

For the 2D case, two different types of the cookie-cutter functions may be proposed to model $g_2$ for regular polygons: the square wave function as $$square.wave.\ 2\ d(\theta) = \mathrm{sign}\{\cos[n(\theta - \phi_0)/2]\}, \qquad [9]$$

and the sawtooth wave function with the form $$sawtooth.wave.\ 2\ d(\theta) = (\theta - \phi_0)\mathrm{MOD}\left(2\pi/n\right), \qquad [10]$$

where n is the number of sides and $\phi_0$ is a phase term to shift the cutting position.

For the 3D case with more complex geometries, one may apply the 2D cookie-cutter function in each horizontal layer defined by $\varphi$ by modifying the frequency of the square wave or sawtooth wave function such that its amplitude alternates at any sharp corners of an arbitrary polyhedral defined by $\vartheta_j(\varphi)$, $j=1, \ldots, n$. Thus, one may propose the 3D square wave function to be $$square.wave\ (\theta, \varphi) = \frac{1}{2}\left\{\mathrm{sign}\left[\sin\left(\frac{(-1)^{j+1}\pi\theta}{\vartheta_j(\varphi)}\right)\right] + 1\right\} \qquad [11]$$

and the 3D sawtooth wave function as $$sawtooth.wave\ (\theta, \varphi) = \frac{\theta - \vartheta_{j-1}(\varphi)}{\vartheta_j(\varphi) - \vartheta_{j-1}(\varphi)}, \qquad [12]$$

for $$\vartheta_{j-1}(\varphi) \leq \theta < \vartheta_j(\varphi), j = 1, \ldots, n+1, \text{ where } \vartheta_j(\varphi), j = 1, \ldots, n$$

are the polar angles of sharp transitions with $$\vartheta_0(\varphi) = 0 \text{ and } \vartheta_{n+1}(\varphi) = 2\pi.$$

It can be regarded as the stack of 2D cookie-cutter functions over the $\varphi$-direction, where each layer could have sharp transitions at different angles according to the designed geometry. Notice that there exists no sharp corners when the polyhedron approaches a sphere, and $h_2$ is a constant for spherical shapes.

Figure 2B:
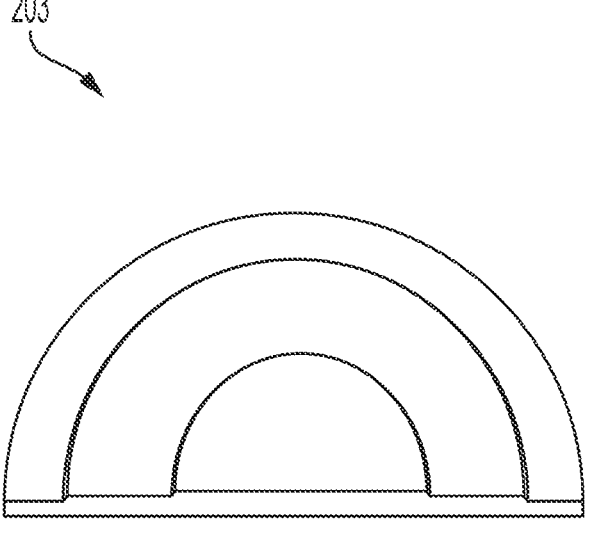
FIG. 2B shows 3D half-cylindrical shapes, in accordance with various embodiments.
Figure 3:
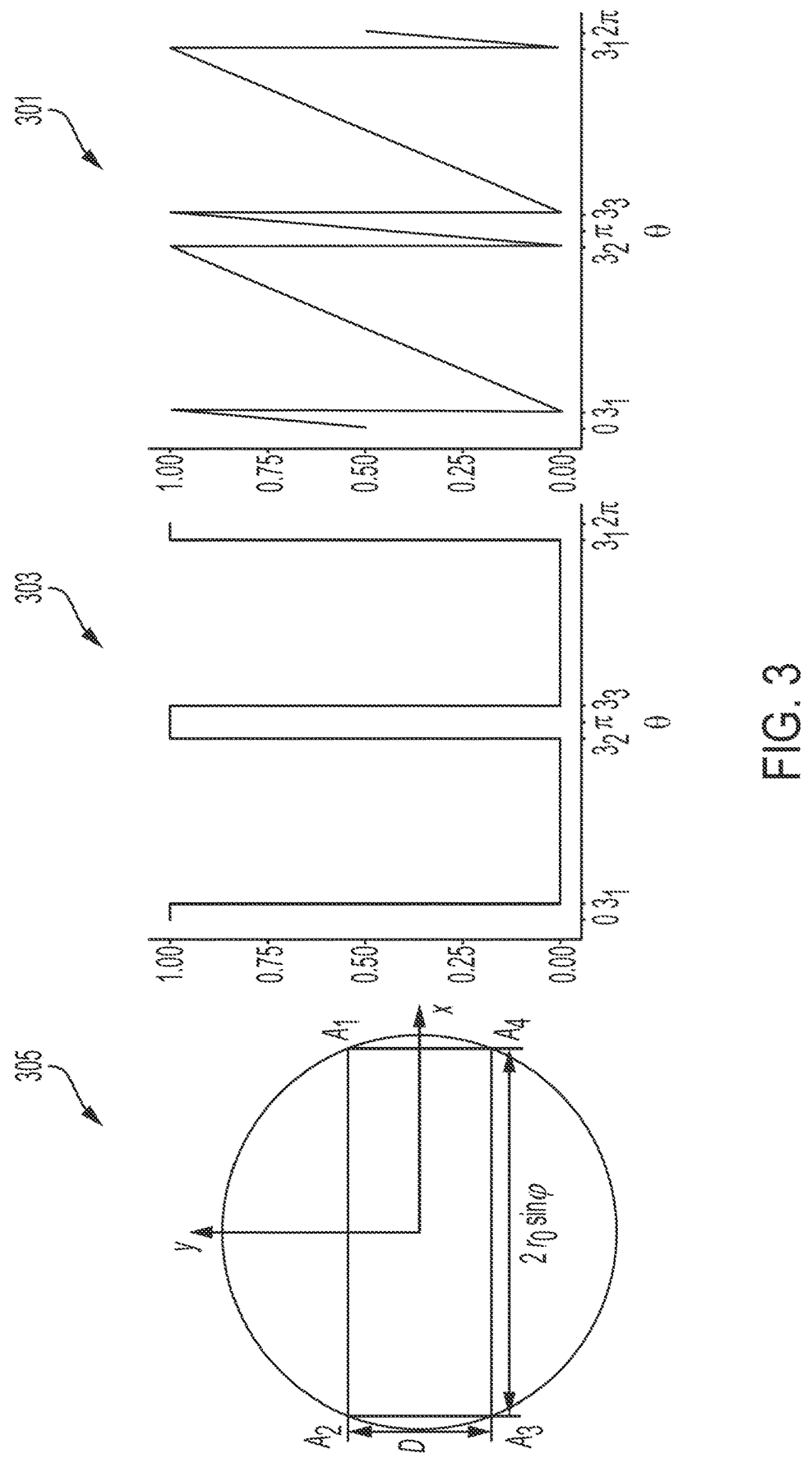
FIG. 3 shows an example shape manufacturable by additive manufacturing and associated square wave and sawtooth wave functions, in accordance with various embodiments.
Figure 4:
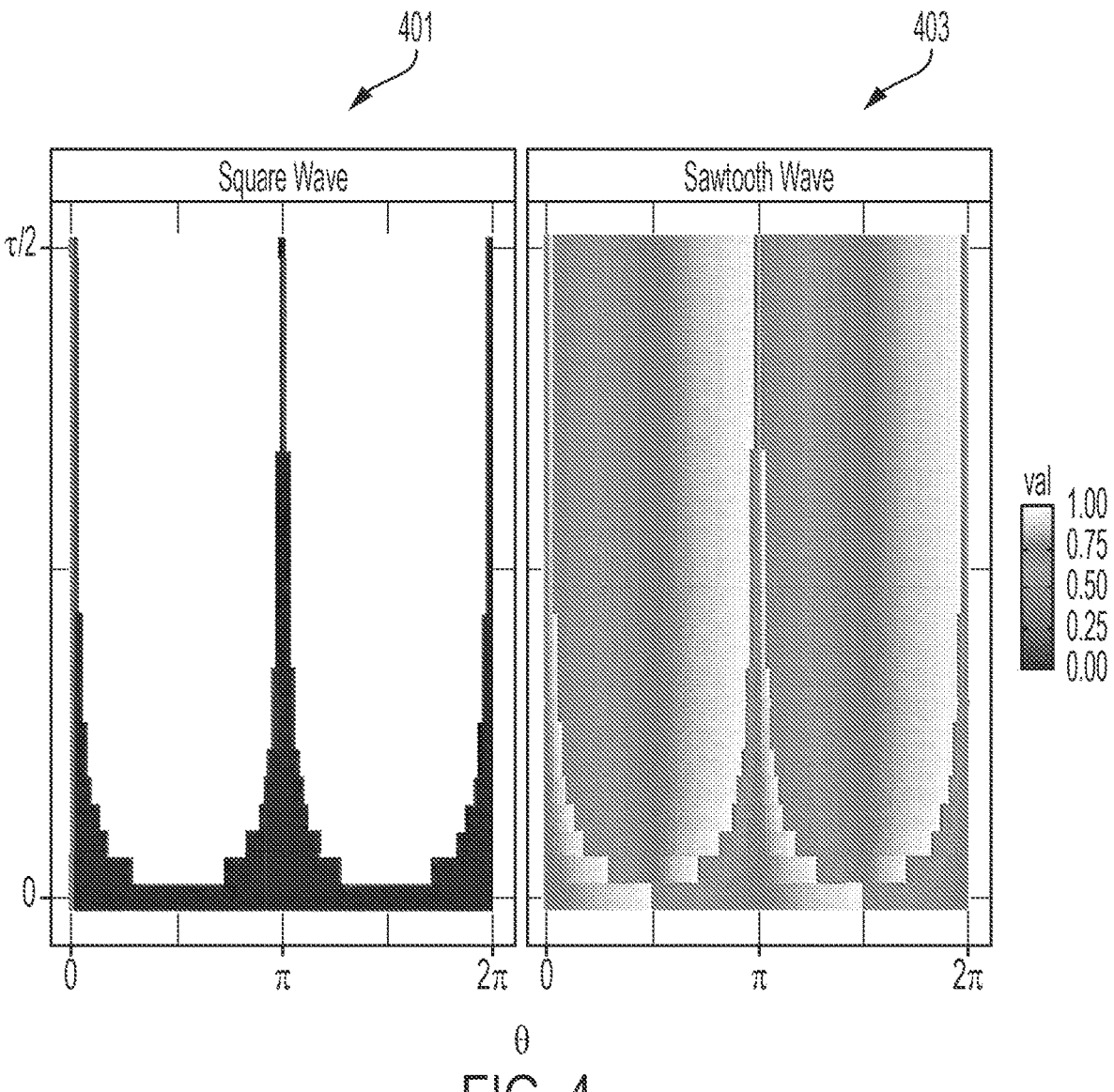
FIG. 4 shows contour plots of proposed 3D square wave and sawtooth wave cookie-cutter functions, in accordance with various embodiments.

As an example, with reference to FIG. 2B and considering the thin wall with a half-cylindrical shape 203 that has radius $r_0$ and thickness D as shown in FIG. 2B, each horizontal layer is a rectangle with length $2r_0 \sin \varphi$ and width D. Referring also to FIG. 3, to cut out a rectangular $A_1A_2A_3A_4$ from its circumcircle 305, one may first find the angles of each corner as $\vartheta_1$, $\vartheta_2$, $\vartheta_3$ and $\vartheta_4$, which incurs the 2D square wave function 303 and 2-D sawtooth wave function 301. Since the rectangle sides in each horizontal layer defined by $\varphi$ are different, the sharp transitions for each layer happen at different polar angles, which are purely defined by the geometry of the product. Referring now to FIG. 4, as the result of Eq. (11) and Eq. (12), the contour plots of proposed 3-D square wave 401 and sawtooth-wave 4030 cookie-cutter functions are shown.

III. Case Study: Shape Deformation Modeling and Estimation for Domes and Thin Walls In this section, the discussion demonstrates the capability of the extended convolution learning framework in Eq. (8) for learning and predicting the shape deviation patterns of a wide variety of geometries containing both spherical and polyhedral shapes. The small training data contains domes and thin walls with half-cylindrical shapes.

A. AM Experiments and Observations

The AM process for this discussion may be the mask image projection stereolithography (MIP-SLA) developed by EnvisionTEC. The AM process may be performed by an additive manufacturing machine 118 as illustrated in FIG. 1. Unlike the traditional SLA process, MIP-SLA projects the sliced mask images dynamically onto a resin surface to build the product. The additive manufacturing machine 118 (FIG. 1) may also include a laser scanner. For instance, after the printing process, a ROMER absolute arm with RS4 laser scanner is used to collect measurements as point clouds, which are then registered using an iterative closest point algorithm.

For spherical products, one may use domes 201 (FIG. 2A) with radii of about 0.5 inch (about 1.27 cm), about 0.8 inch (about 2.03 cm), about 1.5 inch (about 3.81 cm), and about 1.8 inch (about 4.57 cm) as a training set. Referring also to FIG. 2B, three about 0.25-inch-thick (about 0.635 cm) thin walls with half-cylindrical shapes 203 that have radii of about 0.8 inch (about 2.03 cm), about 1.5 inch (about 3.81 cm), and about 2.0 inch (about 5.08 cm), respectively, were vertically printed at the center of the printing platform. One may employ the about 0.8 inch (about 2.03 cm) and about 2.0 inch (about 5.08 cm) thin walls as the training set and leave the about 1.5 inch (about 3.81 cm) thin wall as validation set. Their shape deformation profiles on the SCS are presented in FIG. 5A-C. The discussion also includes the shape deformation of an about 0.8 inch (about 2.03 cm) dome for comparison in FIG. 5D. Specifically, FIG. 5A illustrates shape deformation measurements 501 for an about 0.8-inch (about 2.03 cm) thin wall with half-cylindrical shape. FIG. 5B illustrates shape deformation measurements 503 for an about 1.5-inch (about 3.81 cm) thin wall with half-cylindrical shape. FIG. 5C illustrates shape deformation measurements 505 for an about 2.0-inch (about 5.08 cm) thin wall with half-cylindrical shape. FIG. 5D illustrates shape deformation measurements 507 for an about 0.8-inch (about 2.03 cm) dome. Notably, the deformation pattern of the thin walls differs significantly from the dome shape.

B. Convolution Modeling and Learning

To adopt the convolution learning framework in Eq. (8), the first step is to identify the input function $f$. Note that, due to machine repair, the pattern of shape deformation of 2D circular disks may change, such that the input function $f(\theta, \varphi)$ should have a different pattern and one will need to fit the spherical shape model for the new data. One may extract the pattern from the fitted model for circular shape deformation as $$f(\theta) = \cos\left(2\theta + \frac{\pi}{3}\right)1_{\theta \in [0,\pi)} - \sin(2\theta)1_{\theta \in [\pi, 2\pi)}. \quad [13]$$

Recall that the form of input function was changed to Eq. (3) by multiplying it by $\sin \varphi$ because the radius of each layer is $r_0 \sin \varphi$ for the dome shape. Similarly, the input function $f(\theta, \varphi)$ for spherical shapes is $$f(\theta, \varphi) = \left[\cos\left(2\theta + \frac{\pi}{3}\right)1_{\theta \in [0, p\pi)} - \sin(2\theta)1_{\theta \in [\pi, 2\pi)}\right]\sin \varphi. \quad [14]$$

If the radius is $r_0$ and the thickness is D for the thin wall shape, the circumcircle radius for each horizontal layer $\varphi$ is $$\max_{\theta}\{r_0(\theta, \varphi)\} = \sqrt{r_0^2\sin^2\varphi + \left(\frac{D}{2}\right)^2} \approx r_0\sin \varphi \quad [15]$$

since D is much smaller than $r_0$ for the thin products. Then, one may compute the convolution explicitly and regard the thin walls as cut from the domes with the same radii, and the same input function $f(\theta, \varphi)$ as in Eq. (14) can be applied.

For the transfer function $$g(\theta, \varphi), \quad \text{Eq. (5)}$$

is used since the printing mechanism is the same and only the shapes and sizes change. Thus, the additive term $h_1(\theta, \varphi)$ is fully specified.

Next is to specify the sharp transition angles $\vartheta_j$ and n used in the 3D cookie-cutter function $h_2(\theta, \varphi)$ in Eq. (11). As shown in FIG. 3, n=4 and the angles are $$\vartheta_1 = \arctan(D/(2r_0\sin\varphi)), \vartheta_2 = \pi - \vartheta_1, \vartheta_3 = \pi + \vartheta_1, \vartheta_4 = 2\pi - \vartheta_1$$

according to the geometry of the thin walls.

To capture the arch pattern of thin walls presented in the deformation profiles, choose $h_3(\theta, \varphi)$ as $$h_3(\theta, \varphi) = \left\{\sin\left(\frac{n}{4}\theta\right)1_{\theta \in [\vartheta_1, \vartheta_2)} + \sin\left[\frac{n}{4}(\theta - \pi)\sin\varphi\right]1_{\theta \in [\vartheta_3, \vartheta_4)}\right\}\sin \varphi, \quad [16]$$

where n is the number of sides. For the thin walls, have n=4, and when n→∞, this term becomes white noise.

Follow similar linear assumptions as in [9] to incorporate the size effect, i.e., $$\alpha_0(r_0) = a_1 + a_2 r_0, \quad (1)$$

$$\alpha_1(r_0) = b_1 + b_2 r_0, \quad (2)$$

$$n_1(r_0) = c_1 + c_2 r_0, \quad (3)$$

(4) $n_2$ and $\psi$ are unknown constants, $$\alpha_2(r_0(\theta, \varphi), \theta, \varphi) = d_1 + d_2\left[\sqrt{r_0^2\sin^2\varphi + D^2/4} - r_0(\theta, \varphi)\right], \text{ and} \quad (5)$$

$$\alpha_3(r_0) = e_1 + e_2 r_0. \quad (6)$$

Note that the first four conjectures are for the spherical shape deformation model, and the last two would affect the deformation modeling for thin walls. As the coefficient of the cookie-cutter term, $\alpha_2$ is proportional to the cutting width, i.e., the difference between the circumcircle radius and polygonal shape at each angle, which is $$\sqrt{r_0^2\sin^2\varphi + D^2/4} - r_0(\theta, \varphi).$$

To obtain one unified model for all shapes considering the size effect, one may apply a three-step physics-informed sequential model-fitting strategy. First, one may fit the parametric model without Gaussian process for the deformation of domes because one may treat the spherical shape as the base model. Second, one may fix the parameters estimated in the previous step and fit the parameters of the thin wall shape while ignoring the Gaussian process. Model selection for the cookie-cutter functions can be included here. Third, one may fit a GPR to the residuals of the parametric models for both shapes to capture the spatial correlations.

Figure 6:
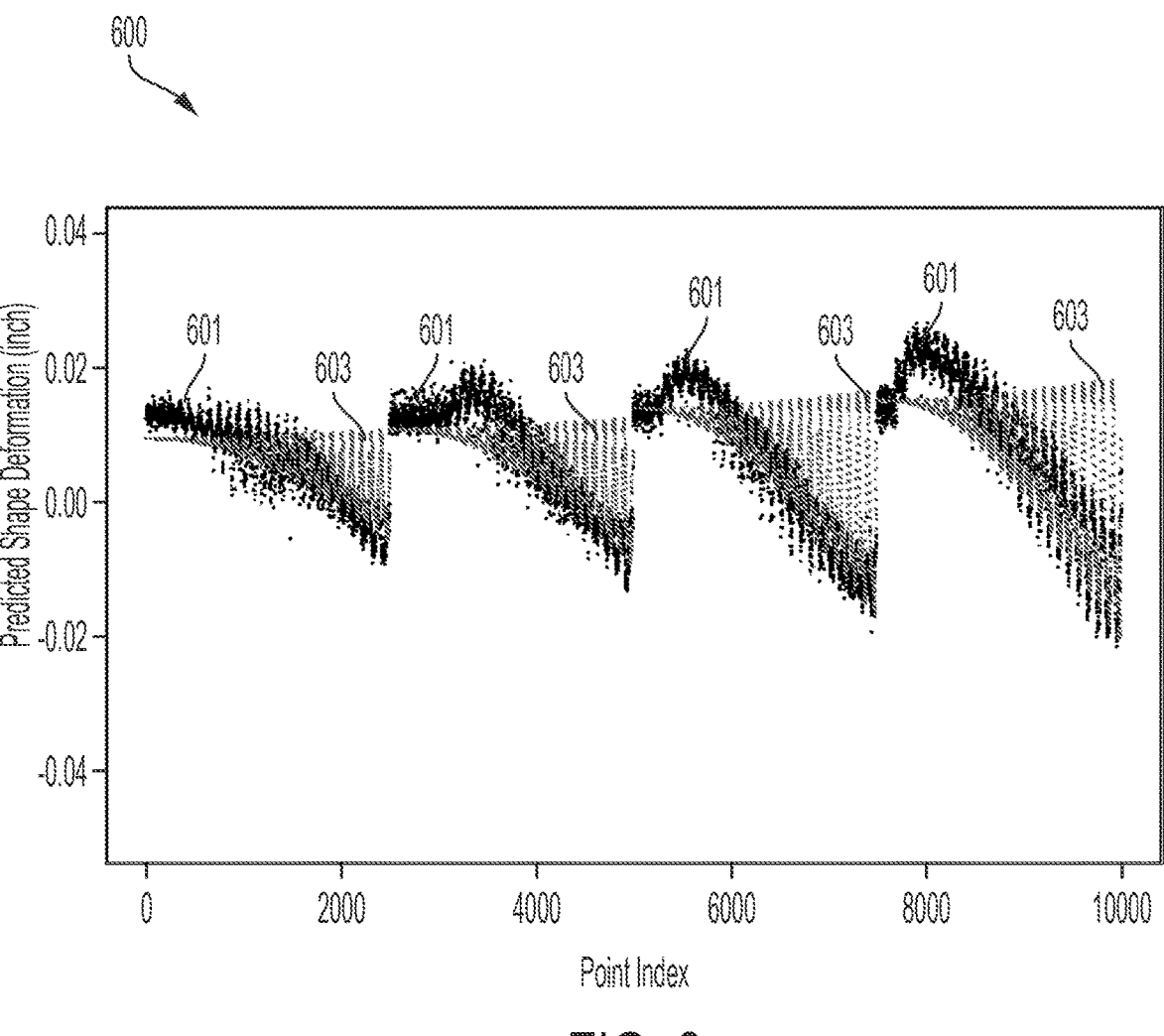
FIGS. 6-7 illustrate measured shape deformations and model predictions, in accordance with various embodiments.
Figure 7:
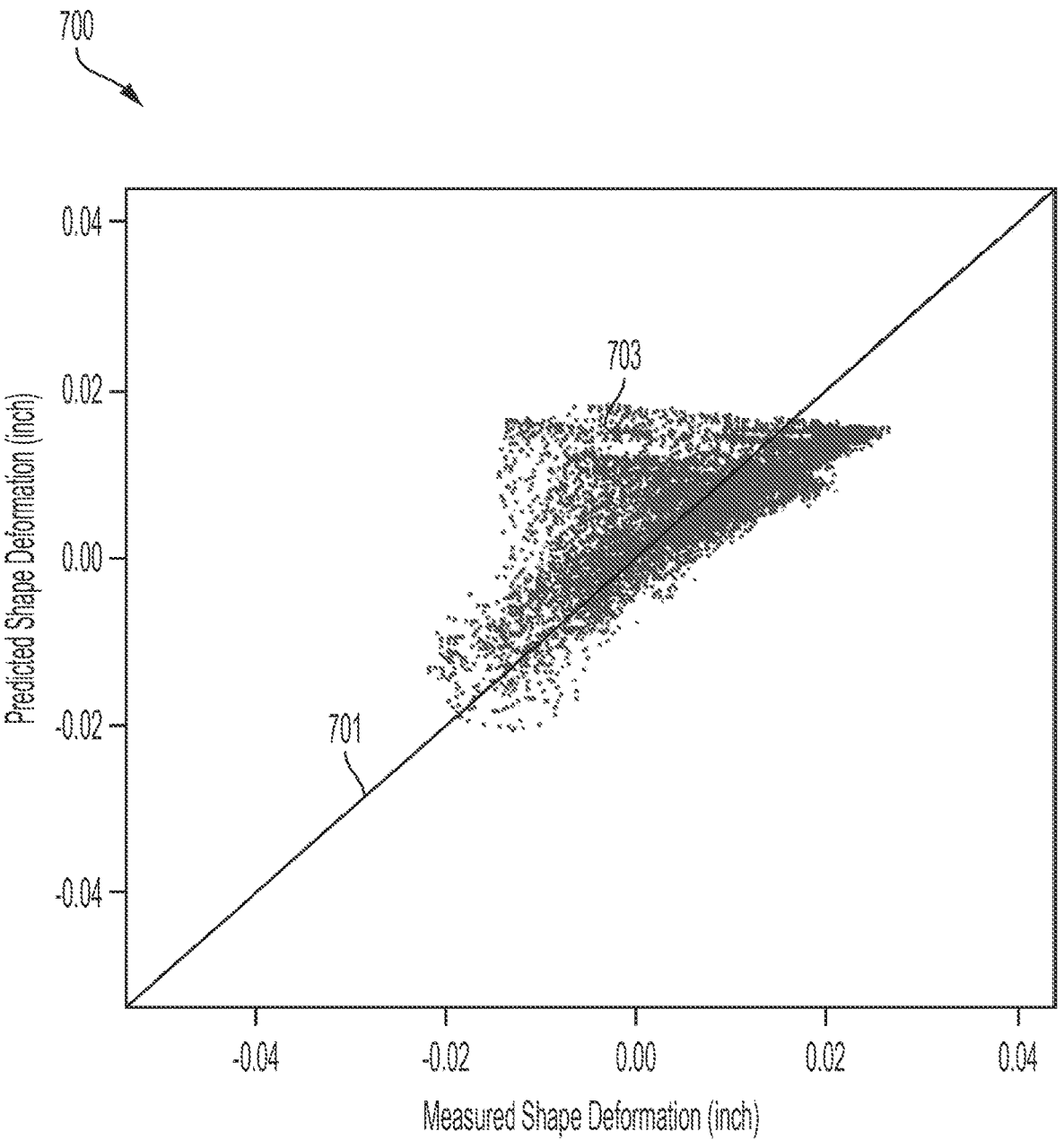

The MLE estimates for the spherical shape deformation model are given in Table I and, referring to FIGS. 6-7, graphs 600, 700 of the measured shape deformations 601, 701 and model predictions 603, 703 are superimposed. The mean absolute error (MAE) is 0.0048 and the root mean square error (RMSE) is 0.0065.

TABLE I

| Parameters | Estimate | Standard Error |
| --- | --- | --- |
| $n_2$ | 0.6445 | 0.006025 |
| $\psi$ | 4.0899 | 0.015667 |
| $a_1$ | 0.0071 | 0.000204 |
| $a_2$ | 0.0044 | 0.000161 |
| $b_1$ | 0.0068 | 0.000606 |
| $b_2$ | 0.0152 | 0.000492 |
| $c_1$ | 0.2315 | 0.157977 |
| $c_2$ | −0.1611 | 0.114623 |
| $\sigma$ | 0.0065 | 0.000046 |

Next, the thin walls with radii of about 0.8-inch (about 2.03 cm) and about 2.0 inch (about 5.08 cm) are used as the training set, and the about 1.5-inch (about 3.81 cm) thin wall is the validation set. After fixing all parameters listed in Table I and knowing that both $h_2$ and $h_3$ are determined by the geometry, a linear model is obtained that can be estimated through the method of least squares estimation (LSE).

Figure 8:
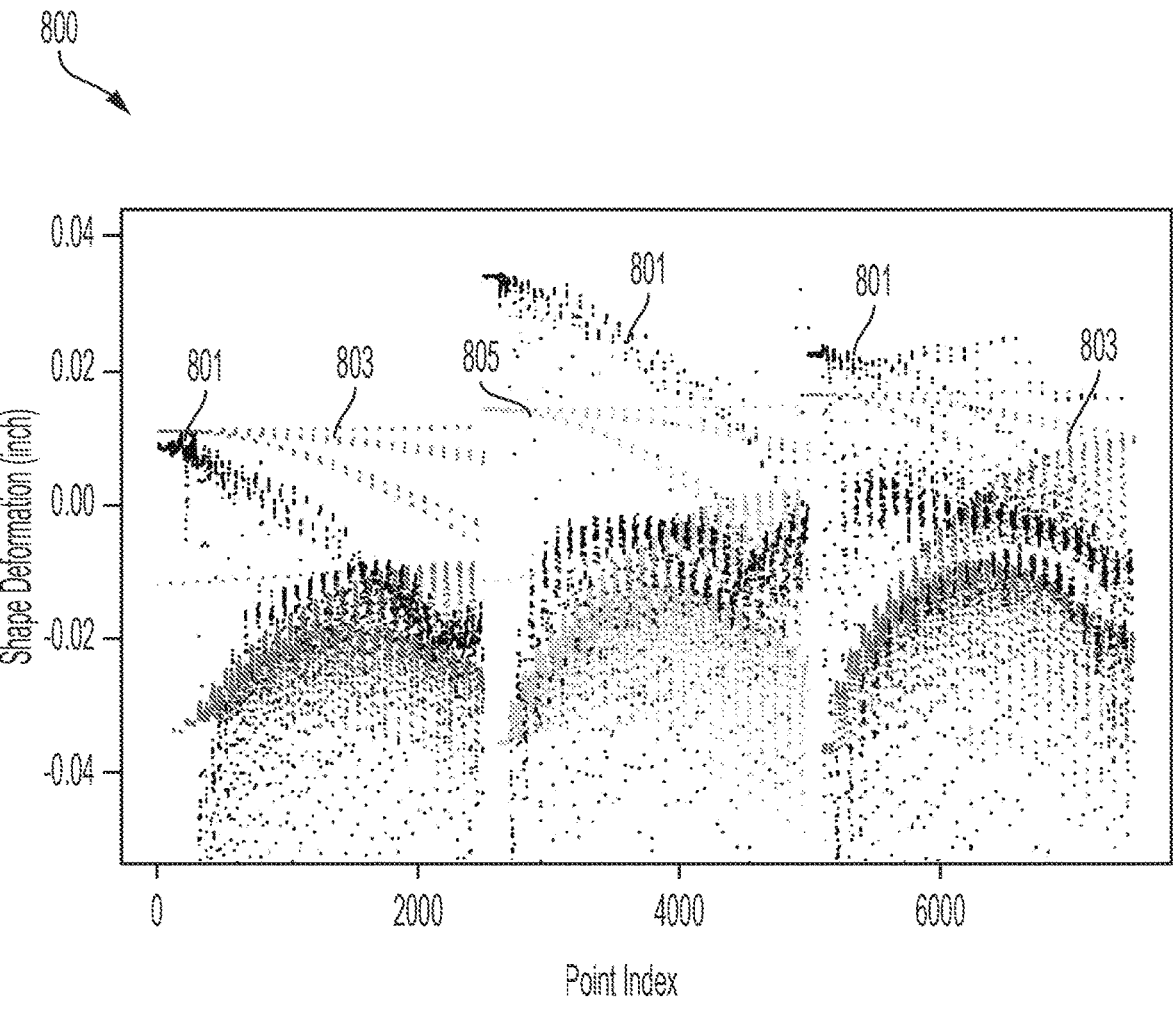
FIG. 8 illustrates a graph of measured shape deformation, training set prediction, and validation set prediction for thin walls applying a square wave cookie-cutter function, in accordance with various embodiments.
Figure 9:
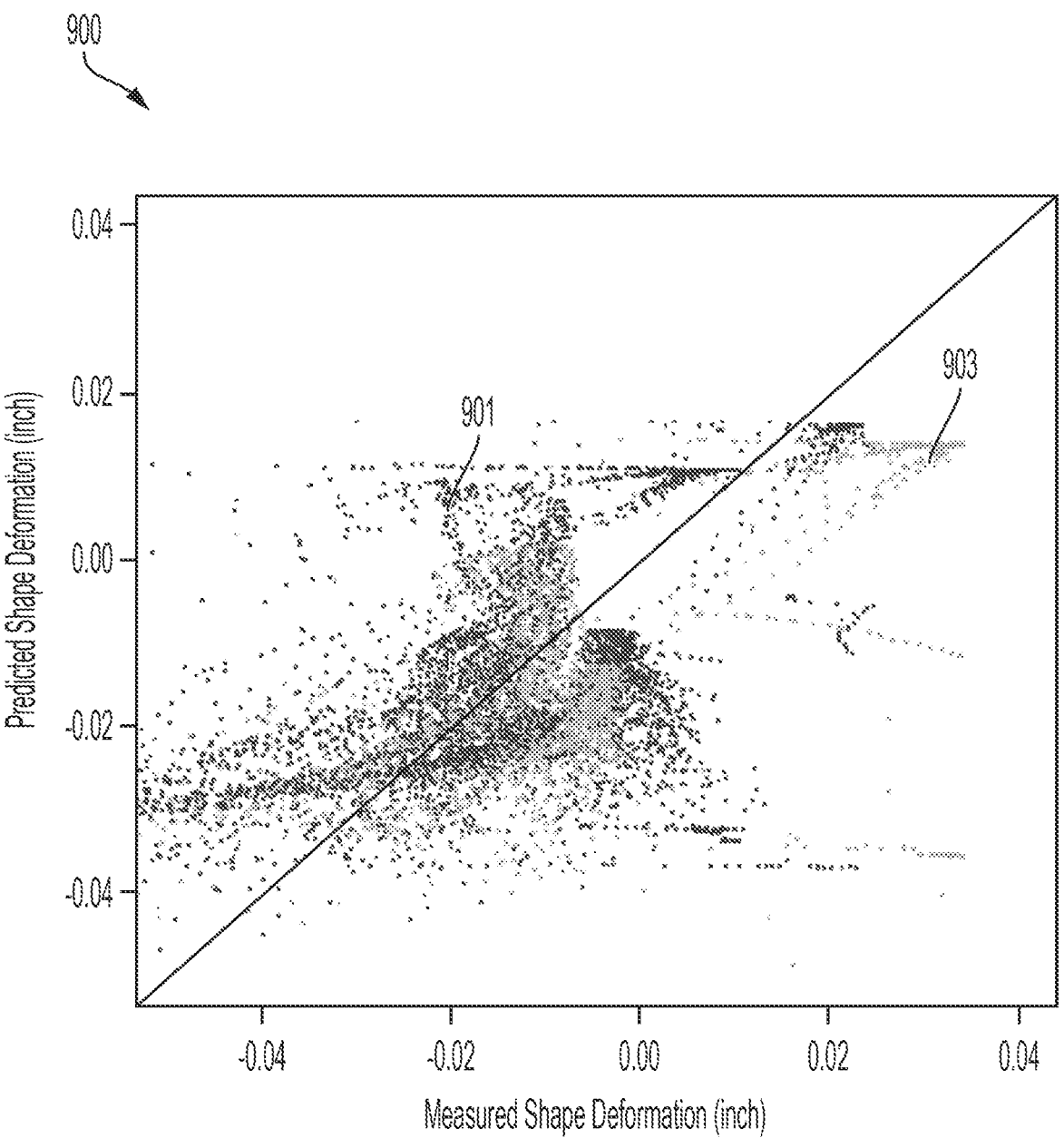
FIG. 9 illustrates a graph of measured shape deformation (x-axis) versus proposed model prediction (y-axis) for thin walls with a training set and validation set applying a square-wave cookie-cutter function, in accordance with various embodiments.
Figure 10:
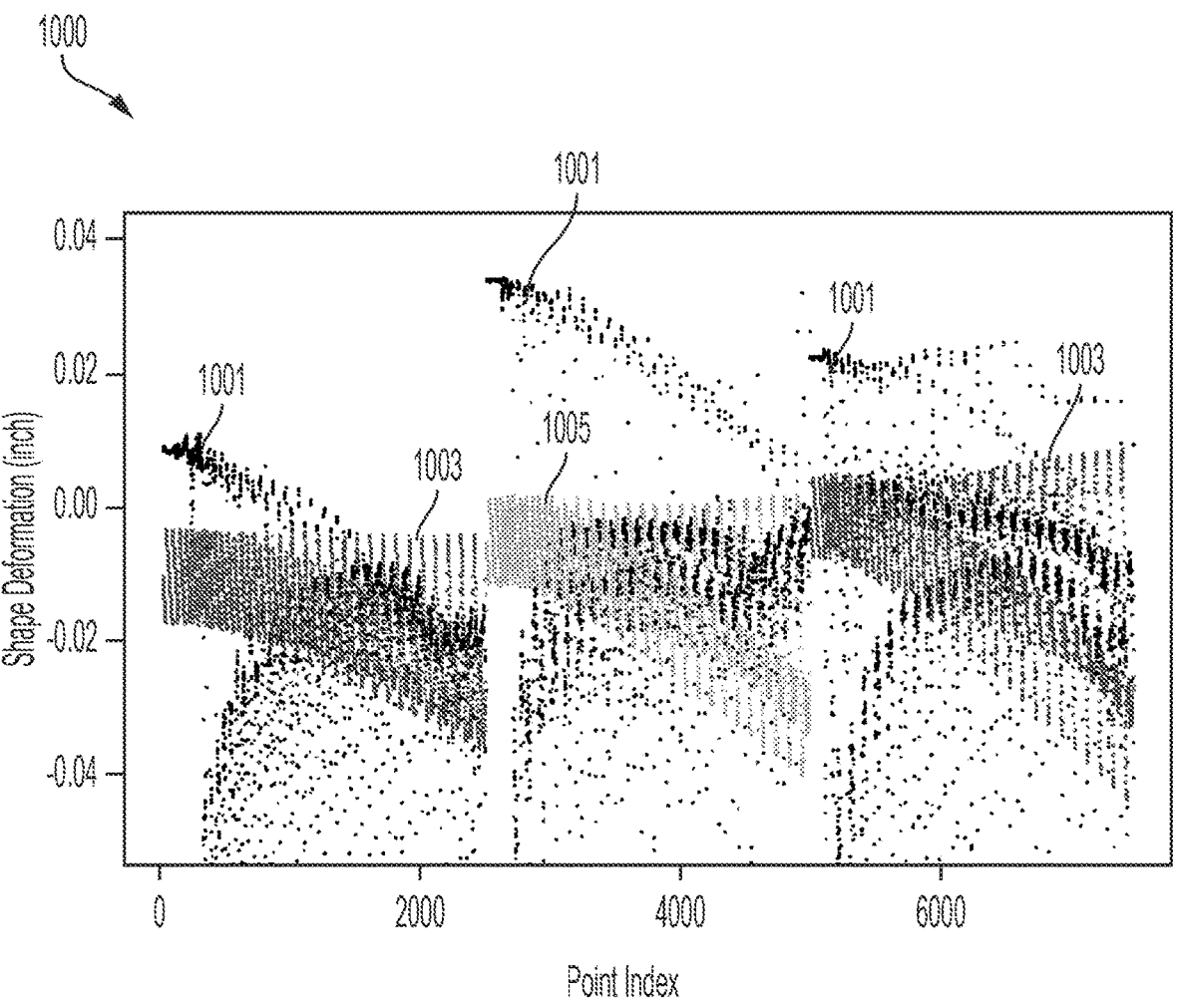
FIG. 10 illustrates a graph of measured shape deformation, training set prediction, and validation set prediction for thin walls applying a sawtooth-wave cookie-cutter function, in accordance with various embodiments.
Figure 11:
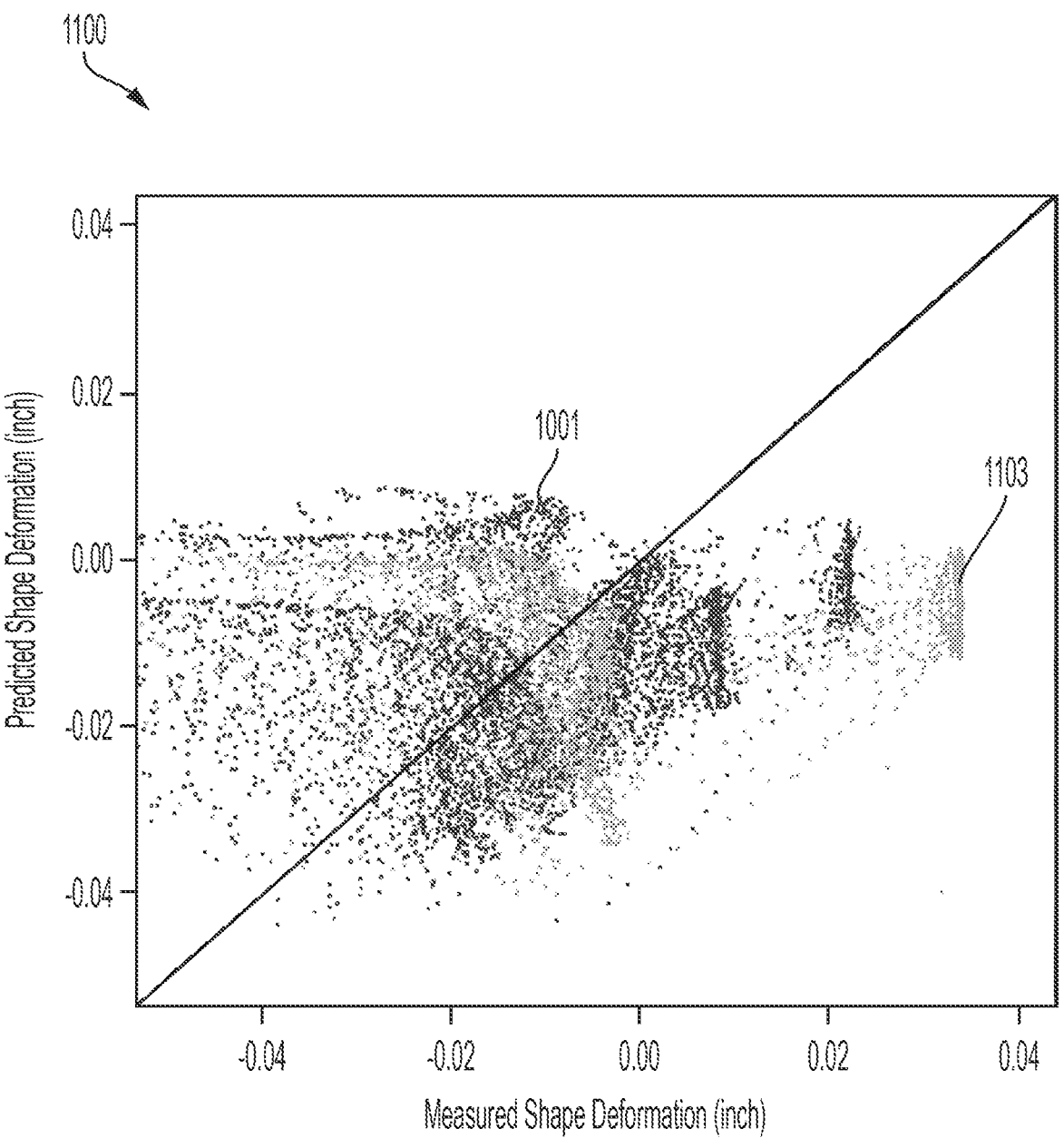
FIG. 11 illustrates a graph of measured shape deformation (x-axis) versus proposed model prediction (y-axis) for thin walls, the graph including a training set and a validation set applying a sawtooth-wave cookie-cutter function, in accordance with various embodiments.

The estimated model parameters for $\alpha_2$ and $\alpha_3$ are shown in Table II, and the measured deformations versus model predictions are presented in FIGS. 8-11 according to the cookie-cutter function applied. FIG. 8 illustrates a graph 800 of measured shape deformation 801, training set prediction 803, and validation set prediction 805 for thin walls applying a square wave cookie-cutter function. FIG. 9 illustrates a graph 900 of measured shape deformation (x-axis) versus proposed model prediction (y-axis) for thin walls with a training set 901 and validation set 903 applying a square-wave cookie-cutter function. FIG. 10 illustrates a graph 1000 of measured shape deformation 1001, training set prediction 1003, and validation set prediction 1005 for thin walls applying a sawtooth-wave cookie-cutter function. FIG. 11 illustrates a graph 1100 of measured shape deformation (x-axis) versus proposed model prediction (y-axis) for thin walls. The graph includes a training set 1101 and a validation set 1103 applying a sawtooth-wave cookie-cutter function.

TABLE II

| Parameters | Square Wave | | Sawtooth Wave | |
|---|---|---|---|---|
| | Estimate | Standard Error | Estimate | Standard Error |
| $d_1$ | −0.0409 | 0.000576 | −0.0311 | 0.000689 |
| $d_2$ | 0.0073 | 0.000648 | −0.0039 | 0.000727 |
| $e_1$ | 0.0164 | 0.001468 | −0.0142 | 0.001643 |
| $e_2$ | 0.0049 | 0.001122 | 0.0172 | 0.001180 |

The model performance metrics are summarized in Table III.

TABLE III

| Cookie-Cutter | Training | | Validation | |
|---|---|---|---|---|
| | MAE | RMSE | MAE | RMSE |
| Square Wave | 0.0071 | 0.0105 | 0.0123 | 0.0164 |
| Sawtooth Wave | 0.0085 | 0.0129 | 0.0174 | 0.0216 |

From both figures and performance metrics, one may find that the square-wave cookie-cutter function performs better than the sawtooth-wave cookie-cutter function for the thin walls, and the performance of the parametric model is better for the spherical shapes than for the thin walls. There are some remaining spatial patterns to be captured, so the residuals are fitted with GPR. Both the squared-exponential kernel with the form $$k(x_i, x_j) = \exp\left((d(x_i, x_j)/r)^2\right), \quad [17]$$

and the Matérn kernel with κ=1.5 as $$k(x_i, x_j) = \exp(-d(x_i, x_j)/r)(1 + d/r), \quad [18]$$

where $d(x_i, x_j)$ is the distance between two samples $x_i$ and $x_j$. To more accurately describe the spatial correlation between two sample points, one first transforms each point to the Cartesian coordinate system, i.e., $x_i=(x_i, y_i, z_i)$. Then the coordinates are standardized to eliminate the size effect and the Euclidean distances between points are computed.

The residuals for all four domes and three thin walls except the one with radius of about 1.5 inch (about 3.81 cm) are used as the training set, and the about 1.5 inch (about 3.81 cm) thin wall with a half-cylindrical shape is left as the validation set. The measurements and model predictions are presented in FIGS. 12-15 and Table IV.

TABLE IV

| Kernel | Training | | Validation | |
|---|---|---|---|---|
| | MAE | RMSE | MAE | RMSE |
| Squared Exponential | 0.0042 | 0.0074 | 0.0096 | 0.0152 |
| Matérn κ = 1.5 | 0.0045 | 0.0075 | 0.0095 | 0.0151 |

Figure 12:
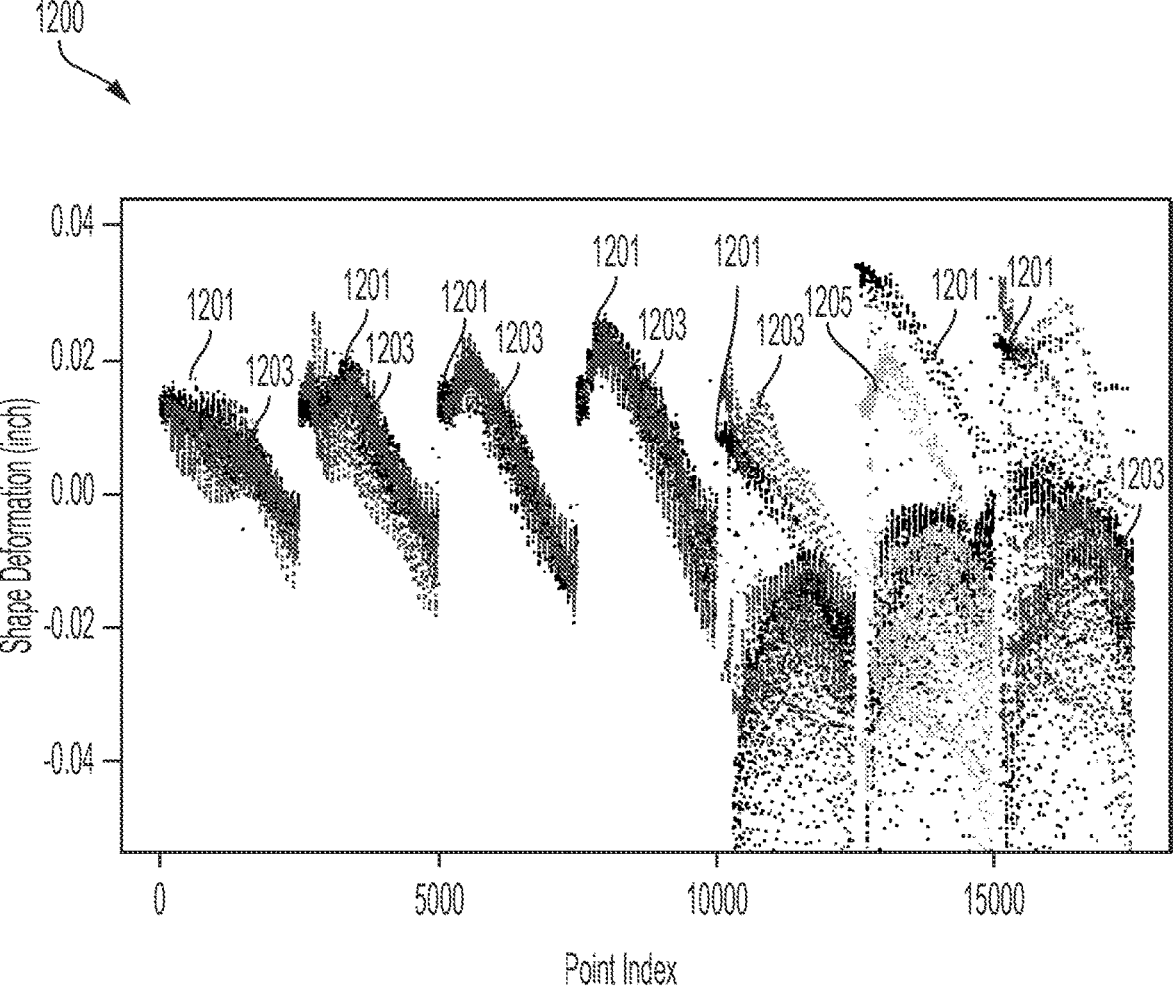
FIG. 12 illustrates a graph of measured shape deformation, training set prediction, and validation set prediction after adding GPR for domes and thin walls with a squared exponential kernel, in accordance with various embodiments.
Figure 13:
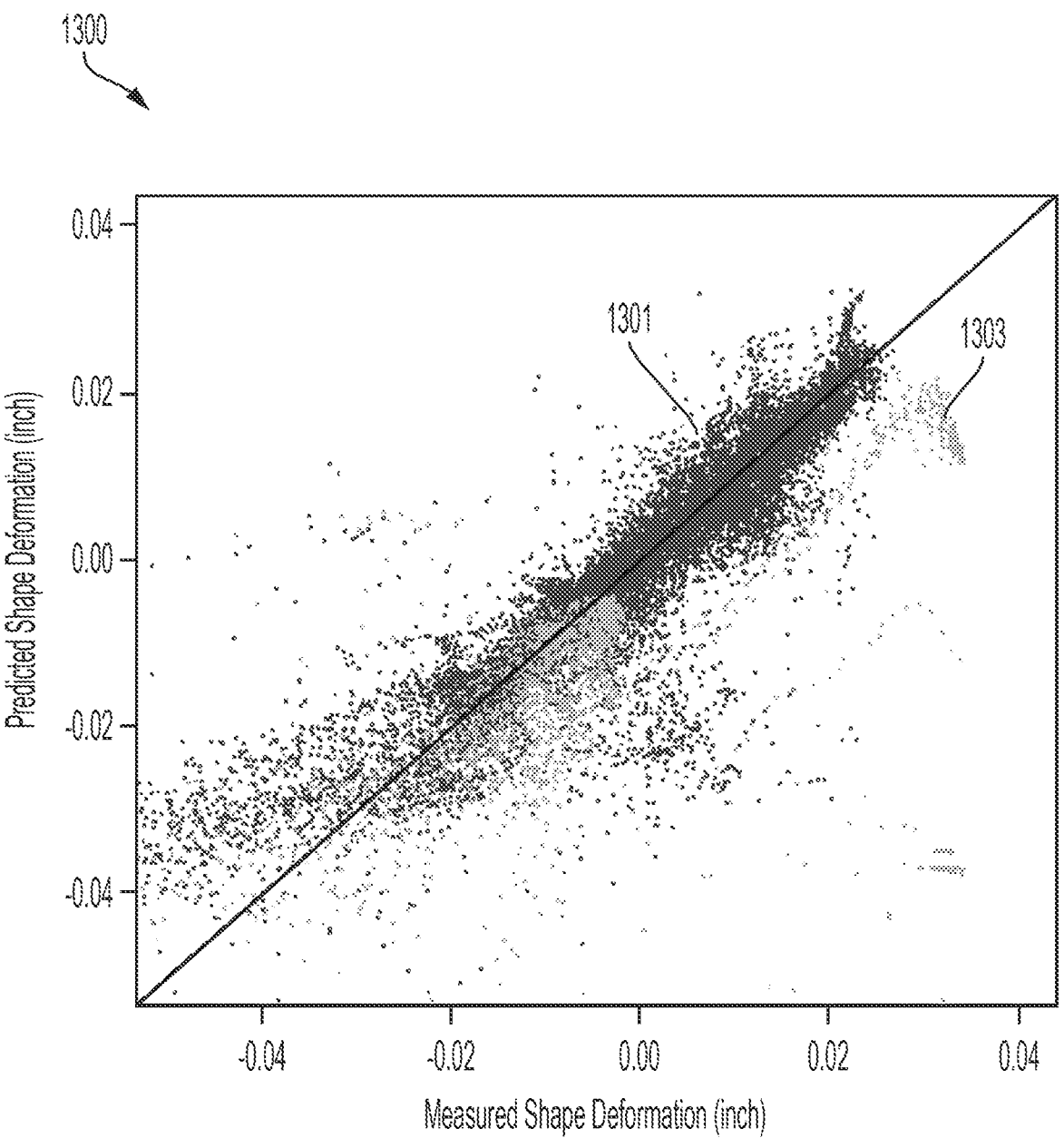
FIG. 13 illustrates a graph of measured shape deformation (x-axis) versus proposed model prediction (y-axis) for all shapes, with a squared exponential kernel and illustrating training set data and validation set data, in accordance with various embodiments.
Figure 14:
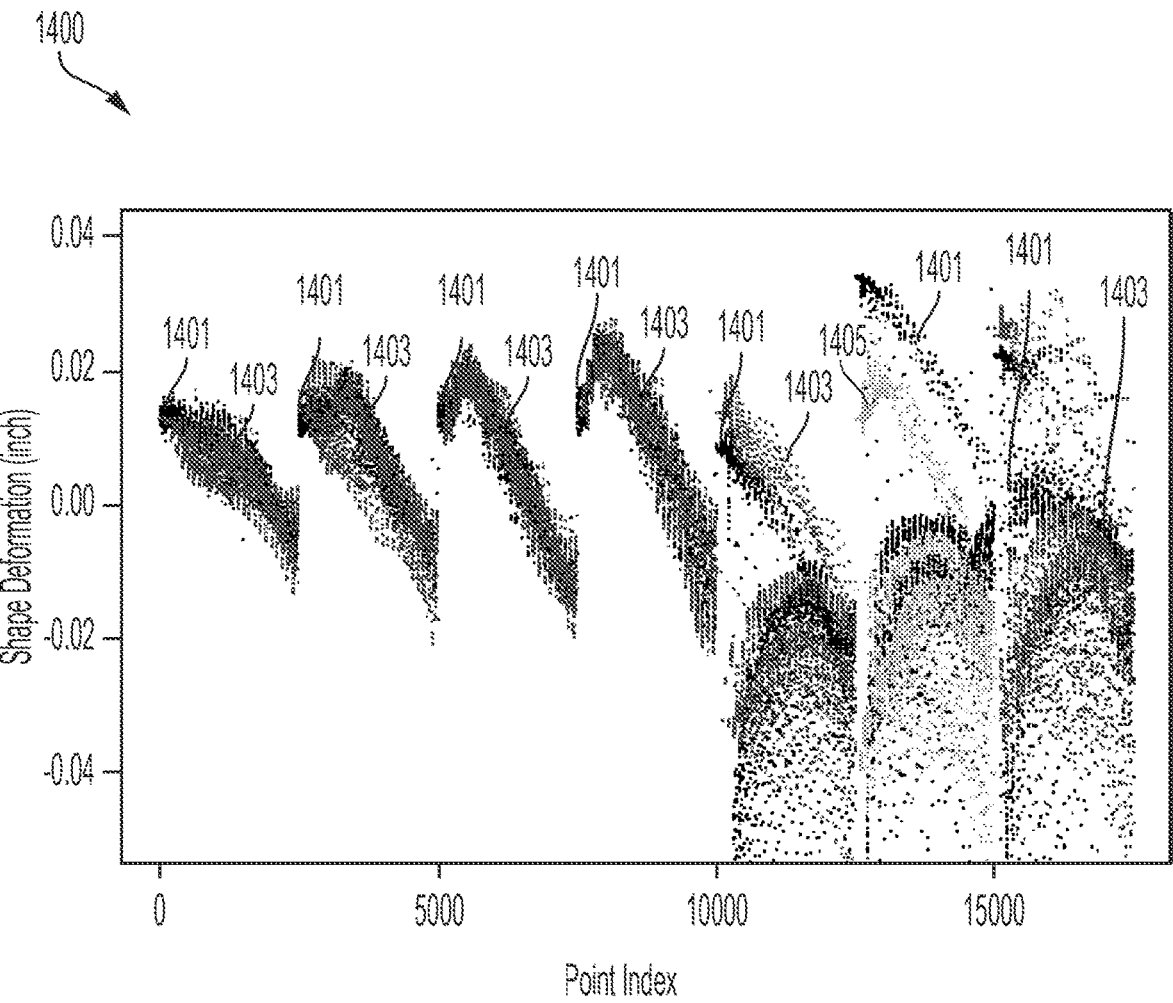
FIG. 14 illustrates a graph of measured shape deformation, training set prediction, and validation set prediction after adding GPR for domes and thin walls with Matérn kernel, in accordance with various embodiments.
Figure 15:
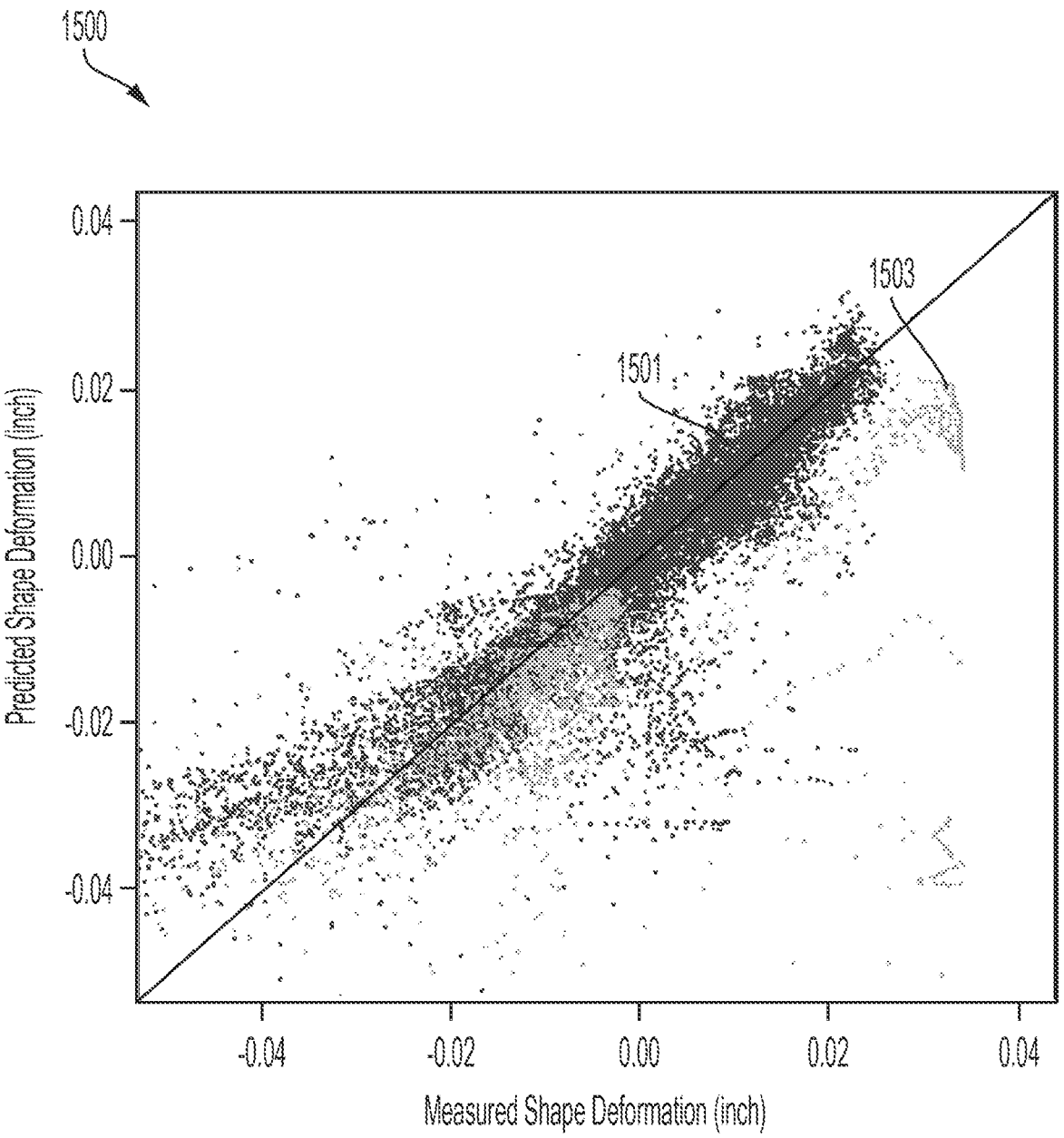
FIG. 15 illustrates a graph of measured shape deformation (x-axis) versus proposed model prediction (y-axis) for all shapes with a squared Matérn kernel and having the training set illustrated and the validation set illustrated, in accordance with various embodiments.

FIG. 12 illustrates a graph 1200 of measured shape deformation 1201, training set prediction 1203, and validation set prediction 1205 after adding GPR for domes and thin walls with a squared exponential kernel. FIG. 13 illustrates a graph 1300 of measured shape deformation (x-axis) versus proposed model prediction (y-axis) for all shapes, with a squared exponential kernel and illustrating training set data 1301 and validation set data 1303. FIG. 14 illustrates a graph 1400 of measured shape deformation 1401, training set prediction 1403, and validation set prediction 1405 after adding GPR for domes and thin walls with Matérn kernel. FIG. 15 illustrates a graph 1500 of measured shape deformation (x-axis) versus proposed model prediction (y-axis) for all shapes with a squared Matérn kernel and having the training set 1501 illustrated and the validation set 1503 illustrated.

Figure 16:
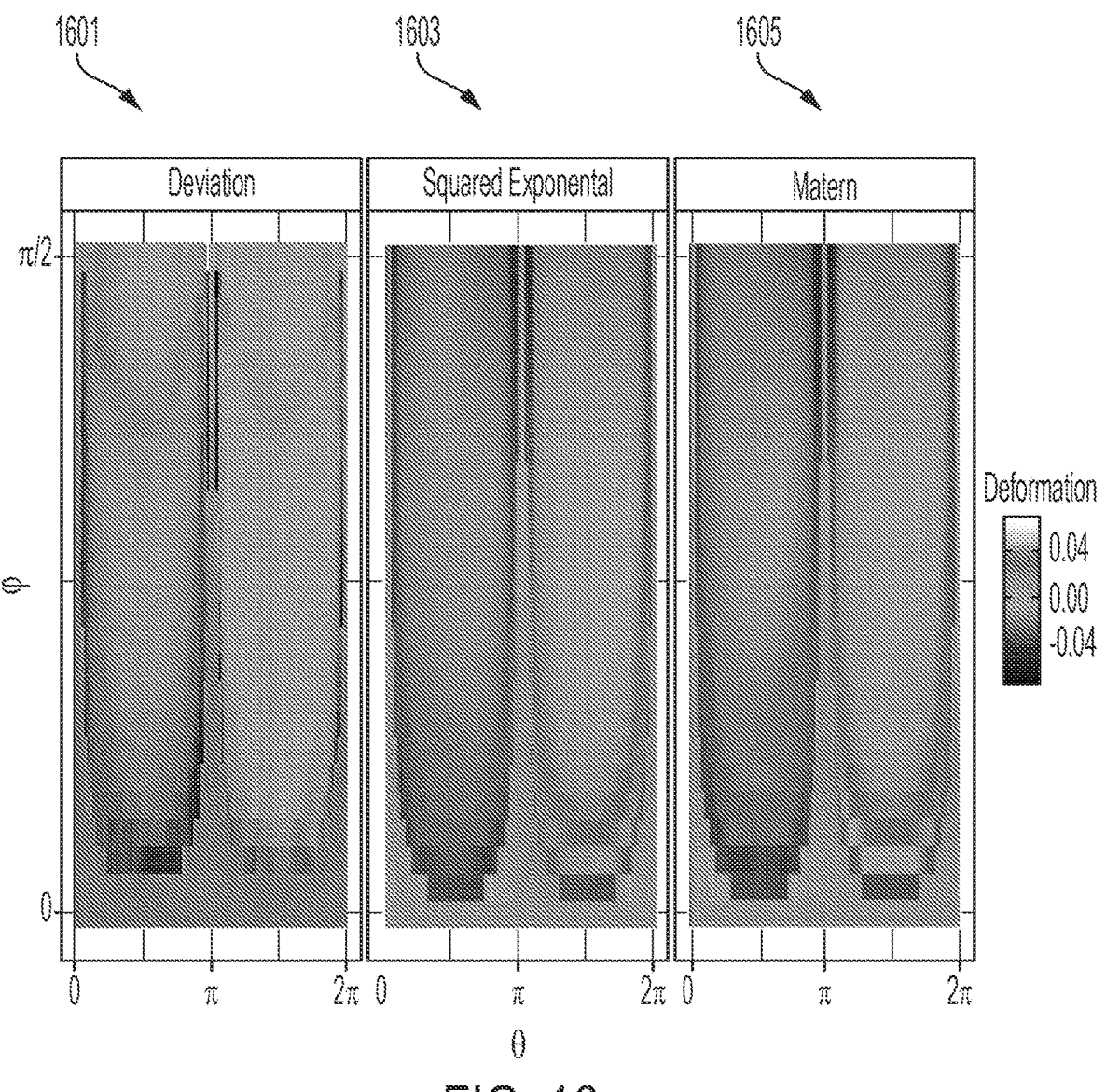
FIG. 16 illustrates a contour plot of shape deformation, model prediction with square-exponential kernel, and model prediction with Matérn kernel for the about 1.5 inch (about 3.81 cm) thin wall, in accordance with various embodiments.

FIG. 16 illustrates a contour plot of shape deformation 1601, model prediction with square-exponential kernel 1603, and model prediction with Matérn kernel 1605 for the about 1.5 inch (about 3.81 cm) thin wall. Though no obvious differences can be found in the performance metrics using different kernel functions (as shown in FIG. 16), since the Gaussian process combines the location information of all shapes together, and the points on the smaller domes are closer to those on the thin walls, about 0.5 inch (about 1.27 cm) and about 0.8 inch (about 2.03 cm) dome deformation predictions are greatly affected by the deformation pattern of thin walls. It suggested that the spatial correlation among different shapes is overestimated.

Due to the physics involved in generating and measuring the shape deformation, geodesic distance between points on the surface would be a better measure of the spatial correlation rather than the Euclidean distance. Though a Mitchell Mount-Papadimitriou (MMP) algorithm can be adopted to compute the geodesic distance between points on a single product, there is no clear definition of geodesic distance among different parts since such path along the surface does not exist.

For two points $x_i$ and $x_j$ lying on the surface of shapes $S_i$ and $S_j$, respectively, one may define a new distance metric as $$dist(x_i, x_j) = \frac{1}{2}\left[dist\left(x_i, x_j'\right) + x_j'x_j + dist(x_j, x_i') + x_i'x_i\right] \quad [19]$$

where $$x_i'$$

is the projection of point $x_i$ onto shape $S_j$, i.e., $$x'_i = Proj_{S_j}(x_i),$$

then $x_j$ and $$x'_i$$

are points on the same part with a properly defined geodesic distance. By adding the projection distance $$x'_j x_j \text{ and } x'_i x_i,$$

one may complete the loop between $S_i$ to $S_j$ and make sure it is a valid distance measure. Another advantage of Eq. (19) is that when two shapes $S_i$ and $S_j$ are the same, the projection distances are zero, and then the proposed distance is the geodesic distance by symmetry, i.e., $$dist(x_i, x'_j) = dist(x_j, x'_i).$$

Figure 17:
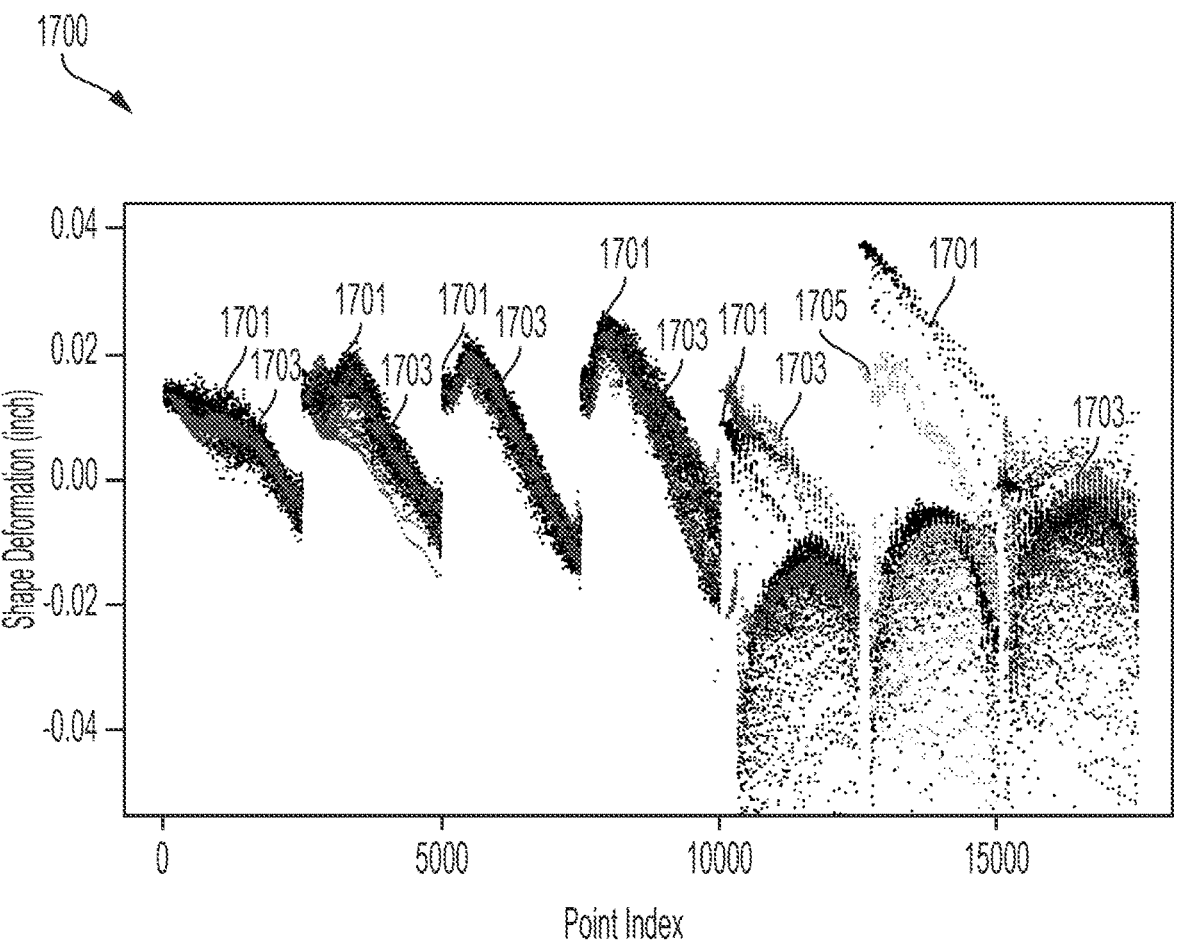
FIG. 17 illustrates a graph of measured shape deformation, training set prediction, and validation set prediction after adding GPR for domes and thin walls with geodesic distance, in accordance with various embodiments.
Figure 18:
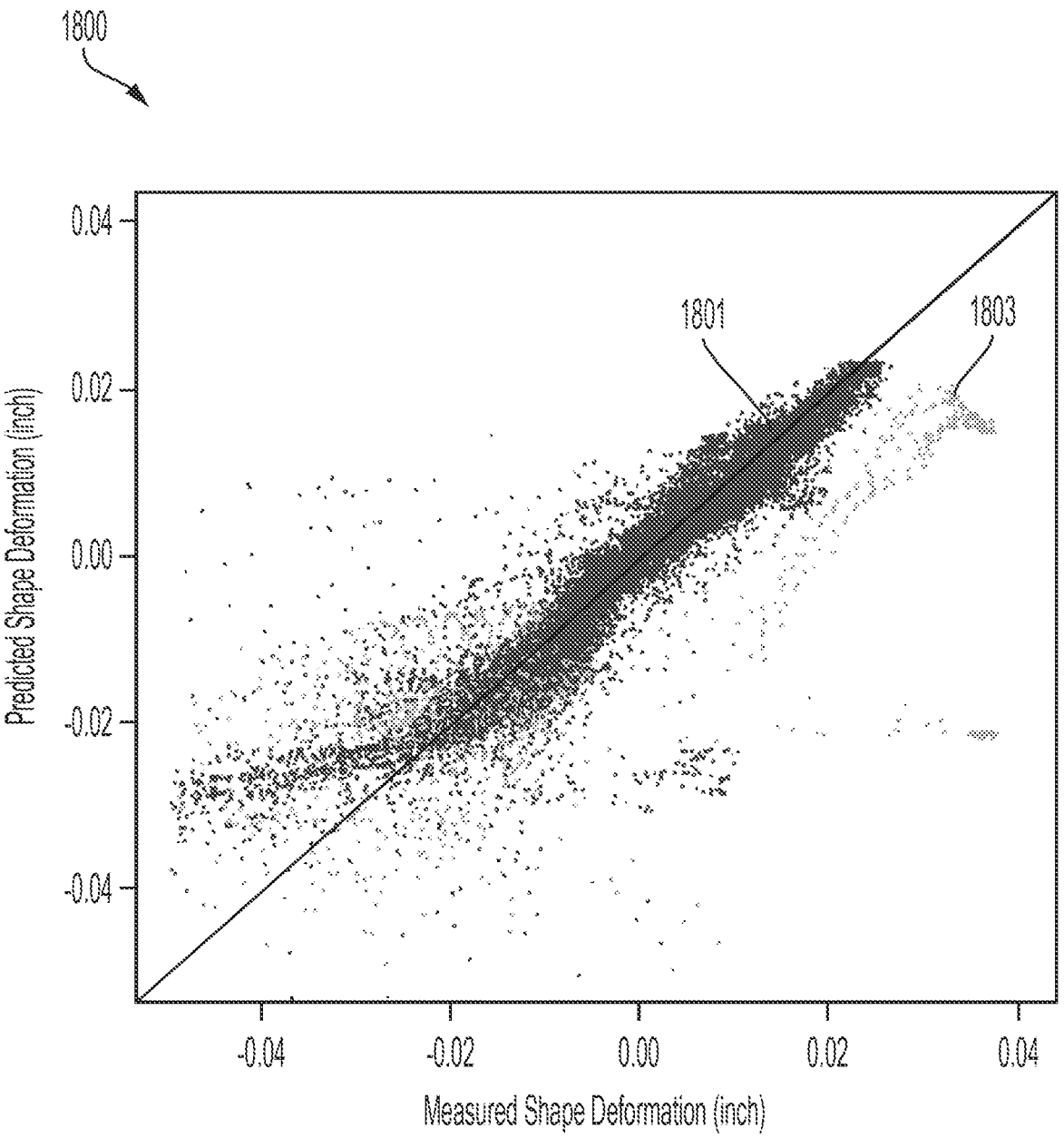
FIG. 18 illustrates a graph of measured shape deformation (x-axis) versus proposed model prediction (y-axis) for all shapes, with geodesic distance and illustrating training set data and validation set data, in accordance with various embodiments.

However, one shortage of geodesic distance is the computational complexity. After resampling the data, one may substitute the proposed distance in the squared exponential kernel in Eq. (17) and run the GPR again. The model prediction and performance are shown in FIG. 17 and FIG. 18. FIG. 17 illustrates a graph 1700 of measured shape deformation 1701, training set prediction 1703, and validation set prediction 1705 after adding GPR for domes and thin walls with geodesic distance. FIG. 18 illustrates a graph 1800 of measured shape deformation (x-axis) versus proposed model prediction (y-axis) for all shapes, with geodesic distance and illustrating training set data 1801 and validation set data 1803.

This work extends the convolution learning framework for shape deviation modeling by enabling joint learning for a wide class of 3D shapes including both spherical and polyhedral shapes. The newly developed 3D cookie-cutter function can effectively capture the unique pattern of the shape deformation for polyhedral shapes. The case study shows that the unified model can successfully predict the shape deformation of both domes and thin wall shapes. Since 3D freeform shapes can be approximated as a combination of spherical and polyhedral patches, the extended convolution learning framework builds a foundation for modeling and predicting the quality of 3D freeform shapes. Lastly, by changing the kernel function and considering new distance measures for points from different shapes, the spatial correlations among different shapes can be correctly incorporated.

In various embodiments, this work may be embodied in a method performed by a system 100 (FIG. 1B). One example method is disclosed in FIG. 19. The method 1900 may be a method for predicting a shape deformation of a 3D printed product comprising a 3D model made up from primitive shapes and having a plurality of individual layers. The method may include determining, using a processor, an input function for each individual layer (block 1902). The input function may describe a layer-wise shape deformation of each individual layer with 2D freeform shapes. The method may include determining, using the processor, a transfer function for accumulating the individual layers together using dome shapes (block 1904). The method may include calculating, using the processor, a convolution using the input function and the transfer function to obtain a shape deformation of the dome shapes (block 1906). The method may include determining, using the processor, a cookie-cutter function for connecting the primitive shapes comprising the 3D model (block 1908). The method may include calculating, using the processor, a summation of the convolution and the cookie-cutter function to generate a deformation function that predicts the shape deformation of the 3D printed product (block 1910). Finally, the method may include generating machine control instructions for an additive manufacturing machine corresponding to the input function offset according to the deformation function to cancel at least a portion of the shape deformation of the 3D printed product (block 1912).

The primitive shapes may include sphere shapes and polyhedron shapes. Moreover, the transfer function may be determined using machine learning techniques. The cookie-cutter function may be determined using machine learning techniques. The transfer function may include a plurality of functional bases including Fourier bases. Determining the deformation function may include executing a gaussian process regression (GPR).

Similarly, and with reference to FIGS. 1A-19, a system for predicting a shape deformation of a 3D printed product is also provided. The 3D printed product may include a 3D model made up from primitive shapes and having a plurality of individual layers. The system, as mentioned, may have a non-transitory computer-readable memory configured to store instructions. The system may have one or more processors. The one or more processors may be configured to execute aspects of this work, including aspects embodied in the methods discuss herein.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for predicting a shape deformation of a 3D printed product comprising a 3D model made up from primitive shapes and having a plurality of individual layers, the method comprising:

determining, using a processor, an input function for each individual layer, the input function describing a layer-wise shape deformation of the each individual layer with 2D freeform shapes;

determining, using the processor, a transfer function for accumulating the individual layers together using dome shapes;

calculating, using the processor, a convolution using the input function and the transfer function to obtain a shape deformation of the dome shapes;

determining, using the processor, a cookie-cutter function for connecting the primitive shapes comprising the 3D model; and calculating, using the processor, a summation of the convolution and the cookie-cutter function to generate a deformation function that predicts the shape deformation of the 3D printed product.

2. The method of claim 1, further comprising generating machine control instructions for an additive manufacturing machine corresponding to the input function offset according to the deformation function to cancel at least a portion of the shape deformation of the 3D printed product.

3. The method of claim 1, wherein the primitive shapes comprise sphere shapes and polyhedron shapes.

4. The method of claim 1, further comprising determining the transfer function using machine learning techniques.

5. The method of claim 1, further comprising determining the cookie-cutter function using machine learning techniques.

6. The method of claim 1, wherein the transfer function comprises a plurality of functional bases including Fourier bases.

7. The method of claim 1, wherein determining the deformation function also includes executing a gaussian process regression (GPR).

8. A system for predicting a shape deformation of a 3D printed product comprising a 3D model made up from primitive shapes and having a plurality of individual layers, the system comprising:
   a non-transitory computer-readable memory configured to store instructions; and
   one or more processor configured to:
      determine an input function for each individual layer, the input function describing a layer-wise shape deformation of the each individual layer with 2D freeform shapes;
      determine a transfer function for accumulating the individual layers together using dome shapes;
      calculate a convolution using the input function and the transfer function to obtain a shape deformation of the dome shapes;
      determine a cookie-cutter function for connecting the primitive shapes comprising the 3D model; and
      calculate a summation of the convolution and the cookie-cutter function to generate a deformation function that predicts the shape deformation of the 3D printed product.

9. The system of claim 8, wherein the processor is further configured to generate machine control instructions for an additive manufacturing machine corresponding to the input function offset according to the deformation function to cancel at least a portion of the shape deformation of the 3D printed product.

10. The system of claim 8, wherein the primitive shapes comprise sphere shapes and polyhedron shapes.

11. The system of claim 8, wherein the processor determines the transfer function using machine learning techniques.

12. The system of claim 8, wherein the processor determines the cookie-cutter function using machine learning techniques.

13. The system of claim 8, wherein the transfer function comprises a plurality of functional bases including Fourier bases.

14. The system of claim 8, wherein the processor also executes a gaussian process regression (GPR) when determining the deformation function.

15. A non-transitory computer-readable medium comprising computer readable instructions, which when executed by a processor, cause the processor to perform operations for predicting a shape deformation of a 3D printed product comprising a 3D model made up from primitive shapes and having a plurality of individual layers, the operations comprising:
   determining, using the processor, an input function for each individual layer, the input function describing a layer-wise shape deformation of the each individual layer with 2D freeform shapes;
   determining, using the processor, a transfer function for accumulating the individual layers together using dome shapes;
   calculating, using the processor, a convolution using the input function and the transfer function to obtain a shape deformation of the dome shapes;
   determining, using the processor, a cookie-cutter function for connecting the primitive shapes comprising the 3D model; and
   calculating, using the processor, a summation of the convolution and the cookie-cutter function to generate a deformation function that predicts the shape deformation of the 3D printed product.

16. The non-transitory computer-readable medium of claim 15, wherein the operations further comprise generating machine control instructions for an additive manufacturing machine corresponding to the input function offset according to the deformation function to cancel at least a portion of the shape deformation of the 3D printed product.

17. The non-transitory computer-readable medium of claim 15, wherein the primitive shapes comprise sphere shapes and polyhedron shapes.

18. The non-transitory computer-readable medium of claim 15, wherein the operations further comprise determining the transfer function using machine learning techniques.

19. The non-transitory computer-readable medium of claim 15, wherein the operations further comprise determining the cookie-cutter function using machine learning techniques.

20. The non-transitory computer-readable medium of claim 15, wherein the transfer function comprises a plurality of functional bases including Fourier bases.

* * * * *